(12) United States Patent
Okuda et al.

(10) Patent No.: US 9,647,493 B2
(45) Date of Patent: May 9, 2017

(54) CONTROL DEVICE AND POWER DISTRIBUTION SYSTEM

(71) Applicant: SANYO ELECTRIC CO., LTD., Osaka (JP)

(72) Inventors: Yasuo Okuda, Kyoto (JP); Ryuzo Hagihara, Hyogo (JP); Mamoru Kubo, Gunma (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 412 days.

(21) Appl. No.: 14/381,969

(22) PCT Filed: Mar. 5, 2013

(86) PCT No.: PCT/JP2013/001358
§ 371 (c)(1),
(2) Date: Aug. 28, 2014

(87) PCT Pub. No.: WO2013/132832
PCT Pub. Date: Sep. 12, 2013

(65) Prior Publication Data
US 2015/0022004 A1 Jan. 22, 2015

(30) Foreign Application Priority Data
Mar. 5, 2012 (JP) .................... 2012-048115

(51) Int. Cl.
*H02J 7/00* (2006.01)
*H02J 9/00* (2006.01)
(Continued)

(52) U.S. Cl.
CPC ............ *H02J 9/061* (2013.01); *H02J 3/32* (2013.01); *H02J 3/383* (2013.01); *H02J 7/35* (2013.01);
(Continued)

(58) Field of Classification Search
USPC .......................................... 307/66
See application file for complete search history.

(56) References Cited

U.S. PATENT DOCUMENTS

2011/0140520 A1* 6/2011 Lee ................ H01L 31/02021
307/25
2012/0188806 A1 7/2012 Tamura et al.

FOREIGN PATENT DOCUMENTS

JP 08-009648 A 1/1996
JP 08-317665 A 11/1996
(Continued)

OTHER PUBLICATIONS

International Search Report issued in International Application No. PCT/JP2013/001358 with Date of mailing May 28, 2013, with English Translation.

*Primary Examiner* — Rexford Barnie
*Assistant Examiner* — Dru Parries
(74) *Attorney, Agent, or Firm* — McDermott Will & Emery LLP

(57) ABSTRACT

A detection unit determines whether a commercial power supply is in a power failure state or a power distribution state. A power source connection management unit controls whether a solar cell is to be connected to a first power conditioner connected to a storage battery or to be connected to the commercial power supply via a second power conditioner. A load connection controller controls connection of the first power conditioner, commercial power supply, and a load. When the commercial power supply is in a power distribution state, the power source connection management unit does not cause the solar cell to be connected to the first power conditioner but connected to the commercial power supply via the second power conditioner, and the load
(Continued)

connection controller causes the first power conditioner and the commercial power supply to be connected to the load.

4 Claims, 17 Drawing Sheets

(51) Int. Cl.
    *H02J 9/06*         (2006.01)
    *H02J 3/32*         (2006.01)
    *H02J 3/38*         (2006.01)
    *H02J 7/35*         (2006.01)

(52) U.S. Cl.
    CPC ............... *H02J 9/062* (2013.01); *Y02B 10/72* (2013.01); *Y02E 10/563* (2013.01); *Y02E 10/566* (2013.01); *Y02E 70/30* (2013.01); *Y02P 80/14* (2015.11); *Y10T 307/625* (2015.04)

(56) References Cited

FOREIGN PATENT DOCUMENTS

| | | |
|---|---|---|
| JP | 11-127546 A | 5/1999 |
| JP | 2001-095179 A | 4/2001 |
| JP | 2007-209133 A | 8/2007 |
| JP | 2009-284590 A | 12/2009 |

\* cited by examiner

FIG.4

| STATE OF COMMERCIAL POWER SUPPLY | POWER DISTRIBU-TION | TRANSITION FROM POWER DISTRIBUTION STATE TO POWER FAILURE STATE | TRANSITION FROM POWER FAILURE STATE TO POWER DISTRIBUTION STATE |
|---|---|---|---|
| SELECTION BY POWER SOURCE SELECTION UNIT | SECOND TERMINAL | FIRST TERMINAL | SECOND TERMINAL |
| STATE OF FIRST SWITCH | CONNECTION | DISCONNECTION | DISCONNECTION |
| OPERATION MODE OF BIDIRECTIONAL POWER CONDITIONER | SYSTEM INTER-CONNEC-TION | AUTONOMOUS | AUTONOMOUS |

FIG.11

| VOLTAGE IN STORAGE BATTERY > FIRST THRESHOLD VALUE? | Yes | Yes | No | No | No |
|---|---|---|---|---|---|
| POWER VALUE IN STORAGE BATTERY < SECOND THRESHOLD VALUE? | Yes | No | — | — | — |
| CURRENT IN STORAGE BATTERY > THIRD THRESHOLD VALUE? | — | — | Yes | Yes | No |
| ACTUAL RESULT VALUE OF LOAD < FIFTH THRESHOLD VALUE? | — | — | Yes | No | — |
| STATE OF SECOND SWITCH | DIS-CON-NEC-TION | CON-NEC-TION | DIS-CON-NEC-TION | CON-NEC-TION | CON-NEC-TION |

FIG.16

| STATE OF COMMERCIAL POWER SUPPLY | POWER DISTRIBUTION | TRANSITION FROM POWER DISTRIBUTION STATE TO POWER FAILURE STATE | TRANSITION FROM POWER FAILURE STATE TO POWER DISTRIBUTION STATE |
|---|---|---|---|
| PCS SELECTION UNIT | UNIDIRECTIONAL PCS | BIDIRECTIONAL PCS | BIDIRECTIONAL PCS |
| POWER SOURCE SELECTION UNIT | SECOND TERMINAL | FIRST TERMINAL | SECOND TERMINAL |
| FIRST SWITCH | CONNECTION | DISCONNECTION | DISCONNECTION |
| DEPENDENT RELATIONSHIP OF FREQUENCY OF BIDIRECTIONAL POWER CONDITIONER ON COMMERCIAL POWER SUPPLY | SYNCHRONIZATION | ASYNCHRONIZATION | ASYNCHRONIZATION |

CONTROL DEVICE AND POWER DISTRIBUTION SYSTEM

CROSS REFERENCE TO RELATED APPLICATIONS

This application is a U.S. national phase application of PCT International Patent Application Number PCT/JP2013/001358 filed on Mar. 5, 2013, claiming the benefit of priority of Japanese Patent Application Number 2012-048115, filed Mar. 5, 2012, the entire contents of which are incorporated by reference.

BACKGROUND OF THE INVENTION

1. Field of the Invention

The disclosure relates to a power distribution technique, and in particular, to a technique in which power is controlled in a system where a storage battery connected to a renewable energy power generator and a commercial power supply are used in combination.

2. Description of the Related Art

A technique has been recently developed, in which a commercial power supply and a storage battery are used in combination in order to serve as a backup power source for specific electric appliances that should be driven even if power supply is stopped due to power failure of the commercial power supply or to perform peak shaving. On the other hand, a technique for performing a system interconnection operation has also been developed, in which both a renewable energy power generator including a solar cell and a commercial power supply are connected in parallel to supply power to a load from both the commercial power supply and the power generator. Even in such techniques, an inverter for converting the power, generated by a power generator such as a solar cell, into AC power is used.

Additionally, it has been proposed to later install a renewable energy power generator, such as a solar cell, in combination with a technique in which a commercial power supply and a storage battery are used in combination (see Japanese Unexamined Patent Application Publication No. 2001-95179).

RELATED ART

Patent Document

[Patent Document 1] Japanese Unexamined Patent Application Publication No. 2001-95179

SUMMARY OF THE INVENTION

When a renewable energy power generator such as a solar cell and a system in which a commercial power supply and a storage battery are used in combination are installed in combination, it is common to use combined power of the power generated by the power generator and that from the commercial power supply. Accordingly, even if the commercial power supply is in a power failure state, the power generated by the power generator can be supplied also to electric appliances that are of low importance, other than the aforementioned specific electric appliances.

The inventor of the application has recognized the possibility that, in order to preferentially supply the power, generated by a renewable energy power generator such as a solar cell, to the aforementioned specific electric appliances when a commercial power supply is in a power failure state, the power to be supplied to these electric appliances could be increased.

The disclosure has been made in view of these situations, and a purpose of one aspect of the disclosure is to provide a technique in which the power, generated by a renewable energy power generator, is preferentially supplied to a specific electric appliance.

Means for Solving the Problem

In order to achieve the aforementioned purpose, one aspect of the present invention is a control device. This device includes: a detection unit that determines whether a commercial power supply is in a power failure state or a power distribution state; a power source connection management unit that controls, in accordance with a determination result of the detection unit, whether a renewable energy power generator is to be connected to a first power conditioner connected to a storage battery or connected to the commercial power supply via a second power conditioner; and a load connection controller that controls, in accordance with a determination result of the detection unit, whether the first power conditioner and the commercial power supply are to be connected to a load or the commercial power supply is disconnected from the load while the first power conditioner is being connected to the load. Herein, when a determination result of the detection unit is a power distribution state, the power source connection management unit does not cause the power generator to be connected to the first power conditioner but connected to the commercial power supply via the second power conditioner, and the load connection controller causes the first power conditioner and the commercial power supply to be connected to the load. When a determination result of the detection unit makes a transition from a power distribution state to a power failure state, the power source connection management unit causes the power generator to be disconnected from the second power conditioner and to be connected to the first power conditioner, and the load connection controller maintains the connection between the first power conditioner and the load and causes the commercial power supply to be disconnected from the load.

Another aspect of the present invention is a power distribution system. This system includes: a bidirectional power conditioner that is connected to a storage battery at one end and can be connected to a commercial power supply at the other end; a power conditioner selection unit that selectively connects a renewable energy power generator to a unidirectional power conditioner that is connected to the commercial power supply at one end and can be connected to the power generator at the other end, or connect to the bidirectional power conditioner; a switch that connects or disconnect the bidirectional power conditioner to or from the commercial power supply; a power source switching unit that selectively connects a load to a first pathway between the switch and the bidirectional power conditioner or to a second pathway between the switch and the commercial power supply; and a detection unit that determines whether the commercial power supply is in a power failure state or a power distribution state. Herein, when a determination result of the detection unit is a power distribution state, the bidirectional power conditioner causes the power conditioner selection unit to connect the power generator to the unidirectional power conditioner, causes the switch to be connected, and causes the power source switching unit to connect the load to the second pathway. When a result of the detection unit makes a transition from a power distribution state to a power failure state, the bidirectional power conditioner causes the power conditioner selection unit to disconnect the power generator from the unidirectional power conditioner but to connect to the bidirectional power conditioner, causes the switch to be disconnected, and causes the power source switching unit to connect the load to the first pathway.

BRIEF DESCRIPTION OF THE DRAWINGS

Embodiments will now be described, by way of example only, with reference to the accompanying drawing which are meant to be exemplary, not limiting, and wherein like elements are numbered alike in several Figures, in which:

FIG. 4 is a table showing the relationship between a transition of the state of a commercial power supply and the control state of the power distribution system;

FIG. 11 is a table showing the relationship between the magnitude relationship of the information acquired by a management unit according to the variation of Embodiment 1 of the invention to threshold values and the switching state of a second switch;

FIG. 16 is a table showing the relationship between a transition of the operation state of a commercial power supply and selection by a power source switching unit, according to Embodiment 2 of the invention.

DETAILED DESCRIPTION OF THE INVENTION

The invention will now be described by reference to the preferred embodiments. This does not intend to limit the scope of the present invention, but exemplify the invention.

Embodiment 1

The outline of Embodiment 1 of the present invention will be described. Embodiment 1 relates to a power distribution system in which a solar cell and a commercial power system are connected in parallel such that power is supplied to a load from both the commercial power supply and the solar cell and a storage battery is charged. Such a power distribution system is installed, for example, at an office or a home, etc. When an electric power company adopts an hourly electricity rate system, an electricity rate in a nighttime zone is set to be cheaper than that in a daytime zone. As an example of these time zones, the daytime zone is set to be from 7:00 to 23:00, and the nighttime zone to be from 23:00 to 7:00 of the next day. The power distribution system stores, in a nighttime zone, the power from the commercial power supply into the storage battery in order to effectively utilize such a low electricity rate.

The power stored in the storage battery is used as a backup power source for operating important apparatuses (specific loads) such as a server and an elevator, when the commercial power supply is in a power failure state. The storage battery is also used as, so-called peak shaving or peak shift in which the maximum use amount of the commercial power supply in daytime is reduced with the storage battery discharging power in a daytime zone when a use amount of electricity is generally increased.

Thus, the storage battery has two roles as a backup for specific loads and as peak shaving. In order to cause the storage battery to play the two roles, the power distribution system according to Embodiment 1 performs, during a normal time when the commercial power supply is in a power distribution state, peak shaving while securing a certain amount of stored power in the storage battery, and supplies, when the commercial power supply is in a power failure state, power to specific loads by discharging the power from the storage battery.

Figure 1:
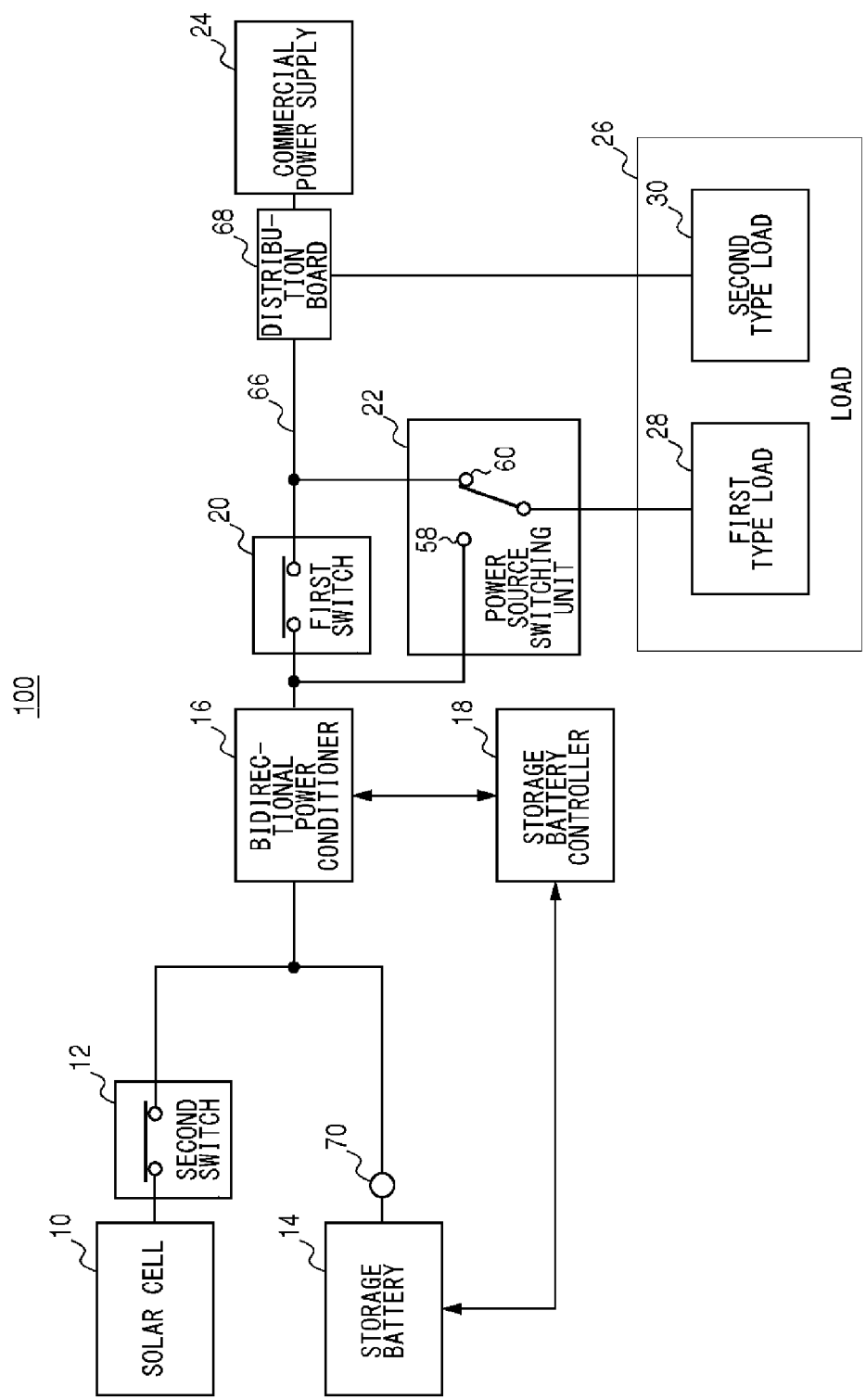

FIG. 1 is a view schematically illustrating a power distribution system 100 according to Embodiment 1 of the present invention. The power distribution system 100 according to Embodiment 1 includes a solar cell 10, a storage battery 14, a bidirectional power conditioner 16, a storage battery controller 18, a load 26, a first switch 20, a second switch 12, a power source switching unit 22, a power distribution pathway 66, a distribution board 68, and a storage battery power detection unit 70. The power distribution system 100 is connected to a commercial power supply 24. In the present description, the case where the power distribution system 100 includes the solar cell 10 will be described as an example; however, the power distribution system 100 may include, without limiting to the solar cell 10, for example, a wind power generator or include them in combination.

The commercial power supply 24 is an AC power supply for supplying the power from an electric power company. The solar cell 10 is a power generator in which light energy is converted directly into power by using a photovoltaic effect. The distribution board 68 is connected to the commercial power supply 24 at its one end, and connected to the bidirectional power conditioner 16 at the other end. The distribution board 68 receives AC power from the one end side or the other end side to supply it to the later-described second type load 30. The distribution board 68 can also measure the AC power received from each of the one end side and the other end side. As the solar cell 10, a silicon solar cell, solar cells using various compound semiconductors as materials, and a dye-sensitized solar cell (organic solar cell), etc., are used.

The bidirectional power conditioner 16 is connected to the storage battery 14 and the solar cell 10 at one end, and can be connected, at the other end, to the commercial power supply 24 via the distribution board 68. Although details will be described later, the bidirectional power conditioner 16 includes a bidirectional inverter for converting the DC power, generated by the solar cell 10 or discharged by the storage battery 14, into AC power and converting the AC power from the commercial power supply 24 into DC power. The bidirectional power conditioner 16 further includes an "operation/stop" button (not illustrated) that is a user interface for stopping or restarting the operation of the bidirectional power conditioner 16. When a user presses the "operation/stop" button while the bidirectional power conditioner 16 is in operation, the bidirectional power conditioner 16 stops the operation, and a user presses the "operation/stop" button while the bidirectional power conditioner 16 is not in operation, the bidirectional power conditioner 16 starts the operation.

The storage battery 14 stores the power from the commercial power supply 24 and the solar cell 10. The AC power from the commercial power supply 24 is converted into DC power by the bidirectional power conditioner 16 and then stored into the storage battery 14. For example, a lithium ion secondary battery is used as the storage battery 14. The storage battery controller 18 measures various physical quantities of the storage battery 14, such as an amount of stored power and temperature, and provides the measured physical quantities to the bidirectional power conditioner 16. The storage battery controller 18 performs control in which the storage battery controller 18 heats the storage battery 14 by controlling a heater for heating it or cools the storage battery 14 by controlling a fan for cooling it, etc. The storage battery power detection unit 70 measures the power for charging the storage battery 14 and that discharged by the storage battery 14. The storage battery controller 18 also acquires a measurement result of the storage battery power detection unit 70.

The second switch 12 is provided among an output terminal of the solar cell 10, an input terminal of the storage battery 14, and the bidirectional power conditioner 16, to turn on or off the connections among the solar cell 10, the storage battery 14, and the bidirectional power conditioner 16. Because an amount of the power generated by the solar cell 10 is dependent on an amount of sunlight, it is difficult to control the amount of the generated power. Accordingly, overcharge of the storage battery 14, occurring due to the power generated by the solar cell 10, can be prevented by providing the second switch 12.

The first switch 20 is provided between the bidirectional power conditioner 16 and the commercial power supply 24 to turn on or off the connection between them. The power source switching unit 22 switches: the connection between a first terminal 58, which is connected to the first pathway branched from is a point between the first switch 20 and the bidirectional power conditioner 16, and the later-described first type load 28; and the connection between a second terminal 60, which is connected to the second pathway branched from the power distribution pathway 66 between the commercial power supply 24 and the first switch 20, and the first type load 28.

The load 26 further include the first type load 28 and the second type load 30. The first type load 28 and the second type load 30 are both AC-driven electric appliances that are driven with AC power, which correspond to the aforementioned specific loads. The second type load 30 is driven with the power from the power distribution pathway 66 connecting the commercial power supply 24 and the first switch 20. The power supplied from the power distribution pathway 66 is basically supplied from the commercial power supply 24 via the distribution board 68, but the power supplied from the solar cell 10 or the storage battery 14 via the bidirectional power conditioner 16 is mixed, for example, while peak shaving is being performed.

Figure 2:
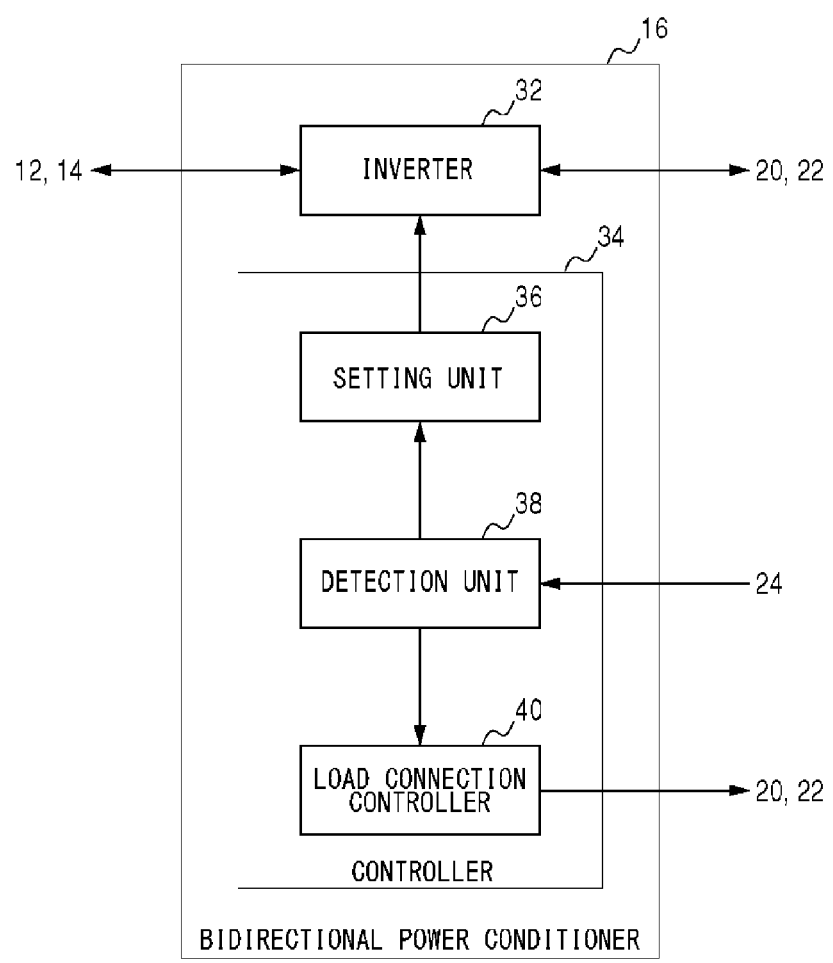
FIG. 2 is a view schematically illustrating the internal configuration of a bidirectional power conditioner according to Embodiment 1 of the invention.

The first type load 28 is an electric appliance that should be driven even if power supply is stopped due to a failure of the commercial power supply 24. The first type load 28 is connected to the first pathway or the second pathway by the power source switching unit 22. When connected to the second pathway, the first type load 28 is driven with the power from the power distribution pathway 66, similarly to the second type load 30. When the first type load 28 is connected to the second pathway, the first switch 20 is simultaneously turned off as described later, and hence the first type load 28 is supplied with power from the solar cell 10 or the storage battery 14 via the bidirectional power conditioner 16, but not supplied with power from the commercial power supply 24. FIG. 2 is a view schematically illustrating the internal configuration of the bidirectional power conditioner 16 according to Embodiment 1 of the invention. The bidirectional power conditioner 16 includes an inverter 32 and a controller 34.

As described above, the inverter 32 converts the DC power generated by the solar cell 10 or that discharged by the storage battery 14 into AC power to supply power to the load 26. The inverter 32 also converts the AC power from the commercial power supply 24 into DC power to charge into the storage battery 14. When the commercial power supply 24 is in a power distribution state, the inverter 32 operates at a frequency synchronized with that of the commercial power supply 24 in order to interconnect with it. When the commercial power supply 24 is in a power failure state, the inverter 32 operates at a frequency asynchronous with that of the commercial power supply 24. The controller 34 further includes: a detection unit 38 configured to detect and determine whether the commercial power supply 24 is in a power failure state or a power distribution state; a setting unit 36 configured to set the frequency of the AC power generated by the inverter 32 from DC power; and a load connection controller 40 configured to control a power source to be connected to the first type load 28. The detection unit 38 always monitors a voltage variation on the wiring connecting the bidirectional power conditioner 16 and the commercial power supply 24, and determines whether the commercial power supply 24 is in a power failure state or a power distribution state, based on a detected voltage variation. The detection unit 38 also detects that the "operation/stop" button has been pressed by a user.

The setting unit 36 sets the frequency of the AC power to be generated by the inverter 32, based on a determination result of the detection unit 38. Specifically, when the detection unit 38 determines that the commercial power supply 24 is in a power distribution state, the setting unit 36 sets a phase and frequency synchronized with those of the commercial power supply 24 in order to interconnect with it. Thereby, it becomes possible to simultaneously consume, in the load 26, both the AC power outputted from the solar cell 10 and the storage battery 14 via the inverter 32 and that from the commercial power supply 24. When the detection unit 38 determines that the commercial power supply 24 is in a power failure state, the setting unit 36 sets a frequency asynchronous with that of the commercial power supply 24. The load connection controller 40 controls turning on/off of the first switch 20 and switching of the power source switching unit 22, based on a determination result of the detection unit 38.

Hereinafter, an operation state may be referred to as a "system interconnection" operation of the bidirectional power conditioner 16, in which the solar cell 10, a dispersed power source, is connected to the commercial power supply 24 and a current synchronized with the voltage of the commercial power supply 24 is run through the system. Herein, the "current synchronized with the system" means a sinusoidal wave current: having the same frequency as that of the commercial power supply 24; excluding a high-frequency current higher than or equal to a stipulated value; and having a power factor of approximately 1 (the same phase as the voltage of the commercial power supply 24). Additionally, an operation state may be referred to as an "autonomous" operation of the bidirectional power conditioner 16, in which the solar cell 10, a dispersed power source, supplies power to specified loads such as the first type load 28, in a state where the solar cell 10 is separated from the commercial power supply 24. During the autonomous operation, the bidirectional power conditioner 16 itself generates a sinusoidal wave voltage having a distortion less than a stipulated value at a stipulated voltage and frequency, from the power generated by the dispersed power source. The bidirectional power conditioner 16 operates while switching the two operation modes of the "system interconnection" operation and the "autonomous" operation.

Figure 3:
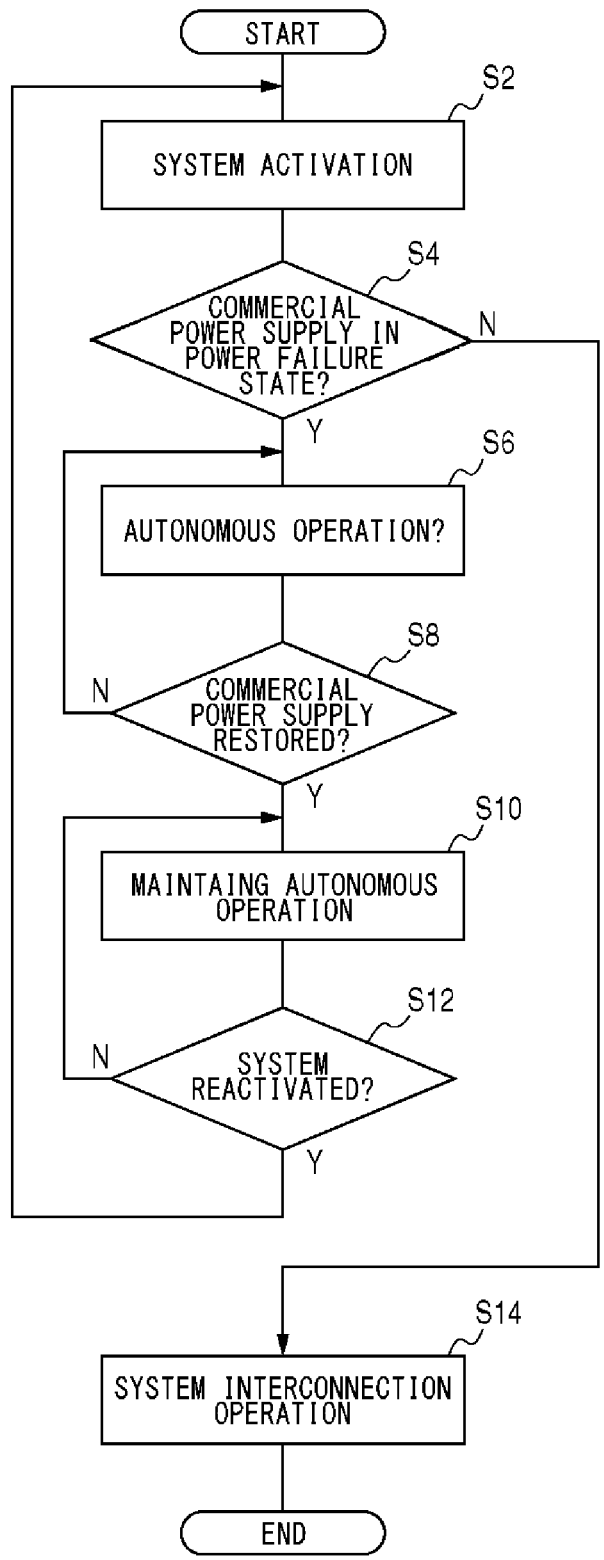
FIG. 3 is a flowchart explaining a flow of processing in the power distribution system according to Embodiment 1 of the invention.

Subsequently, a method of controlling the power distribution system 100 will be described. FIG. 3 is a flowchart explaining a flow of processing in the power distribution system 100. Herein, a method of controlling the power distribution system 100, performed at the time when the bidirectional power conditioner 16 is activated, will be described. FIG. 4 is a table showing the relationship between a transition of the state of the commercial power supply 24 and the control state of the power distribution system 100 (switching of the power source switching unit 22, turning on/off of the first switch 20, and the operation mode of the bidirectional power conditioner 16). The information described in the table in FIG. 4 are stored, for example, in a memory (not illustrated) in the controller 34 in a table format. The setting unit 36 and the load connection controller 40 manage the inverter 32, the first switch 20, and the power source switching unit 22 with reference to this table. When the bidirectional power conditioner 16 is activated (S2), the detection unit 38 first determines whether the commercial power supply 24 is in a power failure state or a power distribution state (S4). When the detection unit 38 determines that the commercial power supply 24 is in a power distribution state (S4/N), the load connection controller 40 turns on the first switch 20 and causes the power source switching unit 22 to connect the second terminal 60 and the first type load 28 (second pathway). At this time, the setting unit 36 sets the frequency and phase of the inverter 32 so as to synchronize with those of the commercial power supply 24. Accordingly, the bidirectional power conditioner 16 operates in the system interconnection operation mode (S14). Thus, the first type load 28 is electrically connected to both the commercial power supply 24 and the bidirectional power conditioner 16 by being connected to the second pathway. Accordingly, the power from the commercial power supply 24 and that from the solar cell 10 transmitted via the bidirectional power conditioner 16 are supplied to the first type load 28 via the second pathway. When the power generated by the solar cell 10 is deficient, the power discharged by the storage battery 14 is also supplied to the first type load 28 via the bidirectional power conditioner 16 and the second pathway.

When the detection unit 38 determines that the commercial power supply 24 is in a power failure state (S4/Y) at the time when the bidirectional power conditioner 16 is activated, the load connection controller 40 turns off the first switch 20 and causes the power source switching unit 22 to connect the first terminal 58 and the first type load 28 (first pathway). At this time, the setting unit 36 sets the frequency of the inverter 32 so as to become asynchronous with that of the commercial power supply 24, and hence the bidirectional power conditioner 16 operates in the autonomous operation mode (S6). Thus, the first type load 28 is electrically disconnected from the commercial power supply 24 by being disconnected from the second pathway and connected to the first pathway. Because the first type load 28 is connected to the first pathway, the electric connection between the first type load 28 and the bidirectional power conditioner 16 is maintained. Accordingly, the power generated by the solar cell 10 is supplied to the first type load 28 via the bidirectional power conditioner 16 and the first pathway. When the power generated by the solar cell 10 is deficient, the power discharged by the storage battery 14 is also supplied to the first type load 28 via the same pathway. The second type load 30 is disconnected from the bidirectional power conditioner 16 by turning off the first switch 20. Accordingly, the power from the solar cell 10 and the storage battery 14 are not supplied to the second type load 30.

During a power failure state of the commercial power supply 24, the solar cell 10 and the storage battery 14 are required to be separated from the commercial power supply 24 in order to prevent the power in them from flowing into the commercial power supply 24. Because the maximum power storage capacity of the storage battery 14 is limited, the storage battery 14 does not have a power storage capacity by which all of the loads 26 can be supplied with power during a power failure state of the commercial power supply 24. So, in order to continuously supply power to the minimum necessary first type load 28 for a period of time as long as possible, for example, such as lighting at night, it is preferable to electrically disconnect the bidirectional power conditioner 16 from the commercial power supply 24 and electrically disconnect the bidirectional power conditioner 16 from the second type load 30 by turning off the first switch 20, during a power failure state of the commercial power supply 24.

Figure 5:
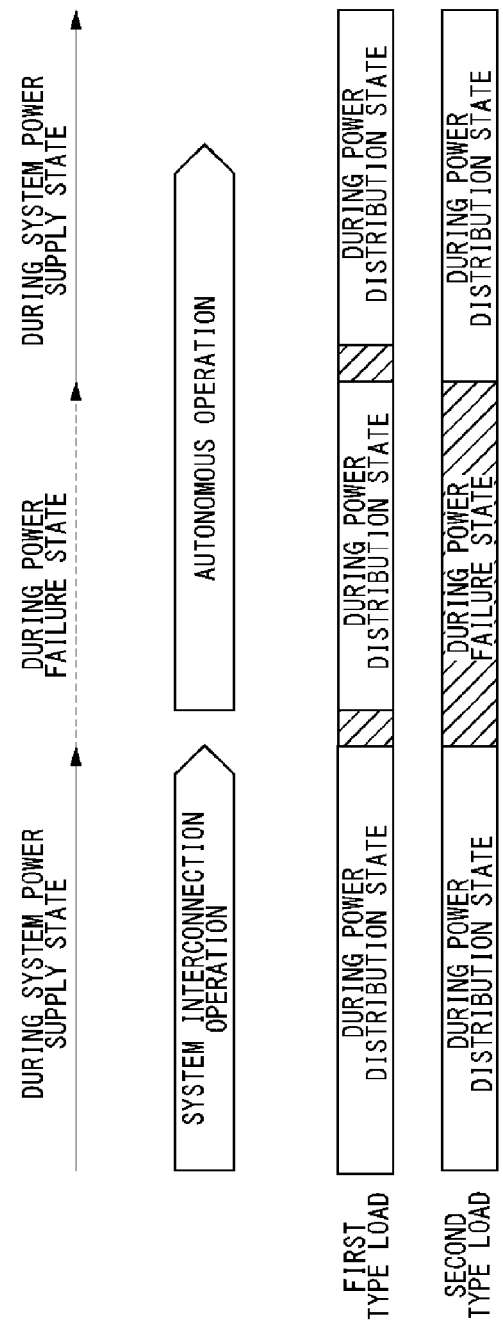
FIG. 5 is a view illustrating the relationship among a transition of the state of a commercial power supply, switching of the operation mode of a bidirectional power conditioner, and the power distribution state of a load.
Figure 6:
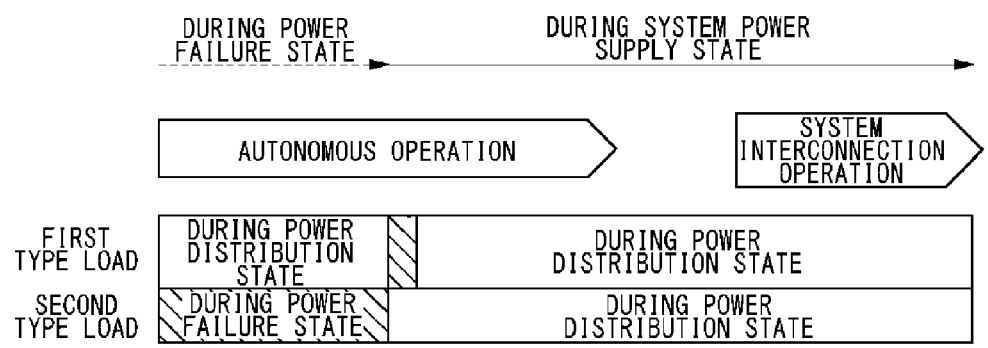
FIG. 6 is a view illustrating the case where the operation of the bidirectional power conditioner is stopped and restarted after the commercial power supply is restored from a power failure state.

Subsequently, a method of controlling the power distribution system 100, performed when the commercial power supply 24 makes a transition from a power distribution state to a power failure state and then is restored and returned to a power distribution state again, will be described with reference to FIGS. 3, 5, and 6. FIG. 5 is a view illustrating the relationship among a transition of the state of the commercial power supply 24, switching of the operation mode of the bidirectional power conditioner 16, and the power distribution state of the load 26. When the commercial power supply 24 is in a power distribution state (S4/N in FIG. 3), the bidirectional power conditioner 16 operates in the system interconnection operation mode (S14). The load connection controller 40 turns on the first switch 20 and causes the power source switching unit 22 to connect the second terminal 60 and the first type load 28 (second pathway). Thereby, the first type load 28 and the second type load 30 are supplied with power from both the commercial power supply 24 and the bidirectional power conditioner 16. When the detection unit 38 determines that the commercial power supply 24 has made a transition from a power distribution state to a power failure state (S4/Y), the load connection controller 40 turns off the first switch 20 and causes the power source switching unit 22 to connect the first terminal 58 and the first type load 28 (first pathway). Thereby, the power supply from the bidirectional power conditioner 16 to the first type load 28 can be maintained, but the second type load 30 is in a power failure state. Additionally, the setting unit 36 sets the frequency of the inverter 32 so as to become asynchronous with that of the commercial power supply 24, and hence the operation mode of the bidirectional power conditioner 16 is switched from the system interconnection operation mode to the autonomous operation mode (S6).

While the commercial power supply 24 is not being restored (S8/N), the bidirectional power conditioner 16 continues the autonomous operation (S6).

In Japan, it is not currently approved that, when the commercial power supply 24 is restored from a power failure state to a power distribution state, a power conditioner is automatically returned to a system interconnection operation mode, unless the power conditioner has received predetermined certification. So, when the detection unit 38 determines that the commercial power supply 24 has made a transition from a power failure state to a power distribution state (S8/Y), the bidirectional power conditioner 16 continues the autonomous operation (S10). At this time, the load connection controller 40 causes the power source switching unit 22 to connect the first type load 28 and the second terminal 60 (second pathway), and maintains the off state of the first switch 20. As a result, the first type load 28 is electrically disconnected from the bidirectional power conditioner 16 and electrically connected to the commercial power supply 24. The first type load 28 is supplied with power only from the commercial power supply 24. The power supply from the commercial power supply 24 to the second type load 30 is also restarted.

In order to switch the operation mode of the bidirectional power conditioner 16 from the autonomous operation to the system interconnection operation when the power failure state is restored, it is necessary to manually reactivate the bidirectional power conditioner 16. The bidirectional power conditioner 16 maintains the autonomous operation (S10), unless reactivated (S12/N). FIG. 6 is a view illustrating the case where the operation of the bidirectional power conditioner 16 is stopped and restarted after the commercial power supply 24 is restored from a power failure state. When determining that the commercial power supply 24 has been restored and then detecting that the "operation/stop" button in the bidirectional power conditioner 16 has been pressed, the detection unit 38 stops the autonomous operation of the bidirectional power conditioner 16. At this time, the first type load 28 and the second type load 30 are connected to the power distribution pathway 66, and hence the power supply from the commercial power supply 24 is maintained even if the operation of the bidirectional power conditioner 16 is stopped. Subsequently, when the detection unit 38 further detects that the "operation/stop" button in the bidirectional power conditioner 16 has been pressed again during a power distribution state of the commercial power supply 24, the bidirectional power conditioner 16 is reactivated (S12/Y). When the power distribution system 100 performs the aforementioned processing at the time when the bidirectional power conditioner 16 is activated, and when the detection unit 38 detects that the commercial power supply 24 is in a power distribution state (S4/N), the bidirectional power conditioner 16 automatically starts the system interconnection operation (S14). Further, the load connection controller 40 maintains the connection to the second terminal 60 by the power source switching unit 22 and turns on the first switch 20. Thereby, the power supply from the commercial power supply 24 to the load 26 is maintained, and the load 26 is also connected to the bidirectional power conditioner 16. As described above, even if the state of the commercial power supply 24 is changed, the power supply to the first type load 28 can be always secured by switching the power source switching unit 22 in accordance with the change. Although the power supply to the first type load 28 is interrupted for about several seconds, when the power source switching unit is switched, the power supply is restarted soon.

Figure 7:
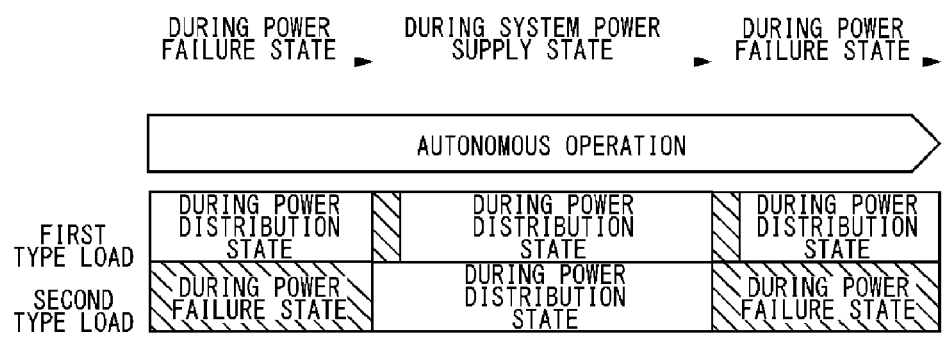
FIG. 7 is a view explaining the operation mode of the bidirectional power conditioner in the case where, when the bidirectional power conditioner is operating in an autonomous operation mode while the commercial power supply is in a power failure state, the commercial power supply is restored and then is in a power failure state again.

When power failure states and power distribution states of the commercial power supply 24 are repeated, the power distribution system 100 can perform the following processing. FIG. 7 is a view explaining the operation mode of the bidirectional power conditioner 16 in the case where, when the bidirectional power conditioner 16 operates in the autonomous operation mode during a power failure state of the commercial power supply 24, the commercial power supply 24 is restored and then is in a power failure state again.

When the detection unit 38 detects that the commercial power supply 24 is in a power distribution state during the autonomous operation of the bidirectional power conditioner 16, the load connection controller 40 causes the power source switching unit 22 to connect the first type load 28 and the second terminal 60 (second pathway), and maintains the off state of the first switch 20. That is, the power supply to the first type load 28 is automatically switched from the bidirectional power conditioner 16 to the commercial power supply 24. On the other hand, the bidirectional power conditioner 16 continues the autonomous operation.

When the commercial power supply 24 is in a power failure state again during the autonomous operation of the bidirectional power conditioner 16, the load connection controller 40 maintains the off state of the first switch 20 and causes the power source switching unit 22 to connect the first terminal 58 to the first type load 28 (first pathway). That is, the power supply to the first type load 28 is automatically switched from the commercial power supply 24 to the bidirectional power conditioner 16. Additionally, the power supply to the second type load 30 is stopped, making the second type load 30 to be in a power failure state.

Figure 8A:
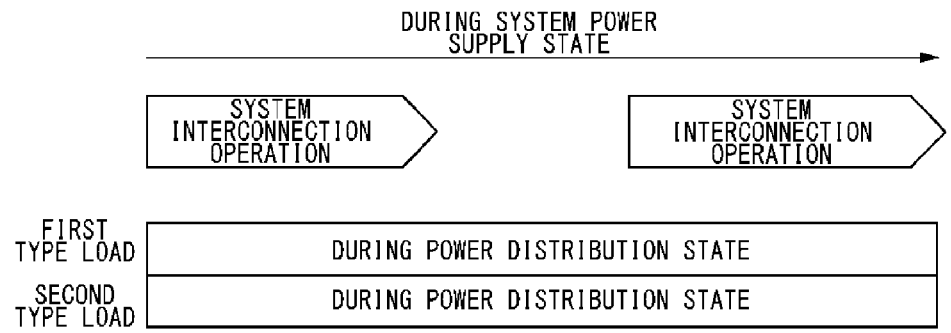
FIGS. 8A to 8C are views illustrating the relationship between a transition of the state of the commercial power supply and the power distribution state of the load in the case where the operation mode of the bidirectional power conditioner is switched manually.
Figure 8B:
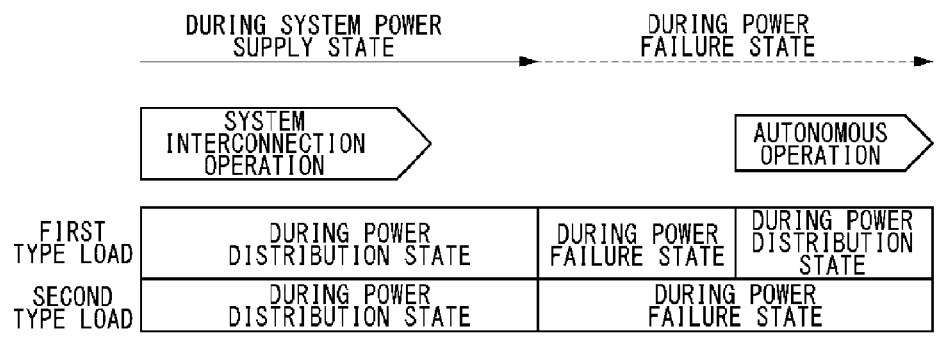
Figure 8C:
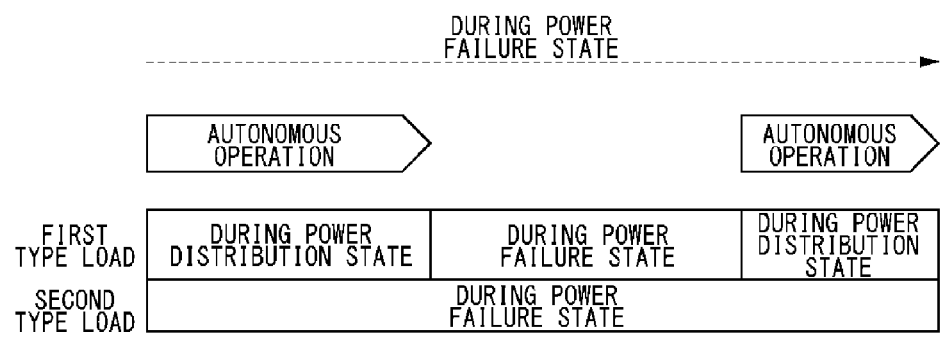

Subsequently, an example will be described with reference to FIGS. 8A to 8C, in which the operation mode of the bidirectional power conditioner 16 is switched manually. FIGS. 8A to 8C are views illustrating the relationship between a transition of the state of the commercial power supply 24 and the power distribution state of the load 26 in the case where the operation mode of the bidirectional power conditioner 16 is switched manually. FIG. 8A is a view illustrating the case where the operation of the bidirectional power conditioner 16 is stopped and restarted during a power distribution state of the commercial power supply 24.

The bidirectional power conditioner 16 operates in the system interconnection operation mode during a power distribution state of the commercial power supply 24. When the "operation/stop" button is pressed during a power distribution state of the commercial power supply 24, the bidirectional power conditioner 16 stops the system interconnection operation. Even in this case, the commercial power supply 24 is in a power distribution state, and hence the first type load 28 and the second type load 30 are both supplied with power from the commercial power supply 24 via the power distribution pathway 66. When the "operation/stop" button is pressed again during a power distribution state of the commercial power supply 24, the detection unit 38 in the bidirectional power conditioner 16 detects the power distribution state thereof, and the bidirectional power conditioner 16 starts an operation in the system interconnection operation mode.

FIG. 8B is a view illustrating the case where the commercial power supply 24 is in a power failure state while the bidirectional power conditioner 16 is not in operation. When the "operation/stop" button is pressed during a power distribution state of the commercial power supply 24, the bidirectional power conditioner 16 stops the system interconnection operation. When the commercial power supply 24 is in a power failure state while the bidirectional power conditioner 16 is not in operation, the power supply to the first type load 28 and the second type load 30 is stopped. When the "operation/stop" button in the bidirectional power conditioner 16 is then pressed during the power failure state of the commercial power supply 24, the detection unit 38 in the bidirectional power conditioner 16 detects the power failure state of the commercial power supply 24, and the bidirectional power conditioner 16 starts an operation in the autonomous operation mode. Thereby, power supply only to the first type load 28 is started.

FIG. 8C is a view illustrating the case where the operation of the bidirectional power conditioner 16 is stopped and restarted during a power failure state of the commercial power supply 24. During the power failure state of the commercial power supply 24, the bidirectional power conditioner 16 operates in the autonomous operation mode. The first type load 28 is only supplied with power, and the second type load 30 is in a power failure state. When the "operation/stop" button is pressed during the power failure state of the commercial power supply 24, the bidirectional power conditioner 16 stops the autonomous operation, also making the first type load 28 to be in a power failure state. When the "operation/stop" button is then pressed during the power failure state of the commercial power supply 24 and while the bidirectional power conditioner 16 is not in operation, the detection unit 38 in the bidirectional power conditioner 16 detects the power failure state of the commercial power supply 24, and the bidirectional power conditioner 16 starts an operation in the autonomous operation mode. Thereby, power is supply only to the first type load 28 is started.

In the aforementioned description, the case has been described, where the bidirectional power conditioner 16 is stopped by a user pressing the "operation/stop" button and is reactivated by the user then pressing the "operation/stop" button again. The bidirectional power conditioner 16 according to an embodiment of the present invention also includes a "reset" button (not illustrated) in addition to the "operation/stop" button. When a user presses the reset button while the bidirectional power conditioner 16 is operating in the autonomous operation mode, the bidirectional power conditioner 16 automatically stops the autonomous operation and can restart the system interconnection operation.

According to the power distribution system 100 of Embodiment 1, power supply from the commercial power supply 24 to the first type load 28 can be started without delay, when the commercial power supply 24 is restored, as described above, thereby allowing consumption of the amount of stored power in the storage battery 14 to be suppressed. Thereby, it becomes possible to control the amount of residual stored power in the storage battery 14 that can be connected to the solar cell 10. Further, it becomes possible to appropriately control the storage battery 14 from when the bidirectional power conditioner 16 is activated.

Variation of Embodiment 1

The relationship among the state of the commercial power supply 24, the operation mode of the bidirectional power conditioner 16, and switching of the circuit in the power distribution system 100 has been described above. This description has been made mainly from the viewpoint that the bidirectional power conditioner 16 is used as a backup for the first type load 28.

As described above, the power distribution system 100 according to an embodiment of the present invention includes the solar cell 10, so that the storage battery 14 is charged with the power supplied from the commercial power supply 24 and also charged with the power generated by the solar cell 10. Unlike the commercial power supply 24, it is difficult to control the amount of the power generated by the solar cell 10, and hence a structure for preventing overcharge, overcurrent, and overvoltage into the storage battery 14 becomes important. So, the control of the voltage and current in the storage battery 14 will be described hereinafter as a variation of Embodiment 1. The configuration of a power distribution system 100 according to a variation of Embodiment 1 is the same as that of the power distribution system 100 according to Embodiment 1 illustrated in FIG. 1.

Figure 9:
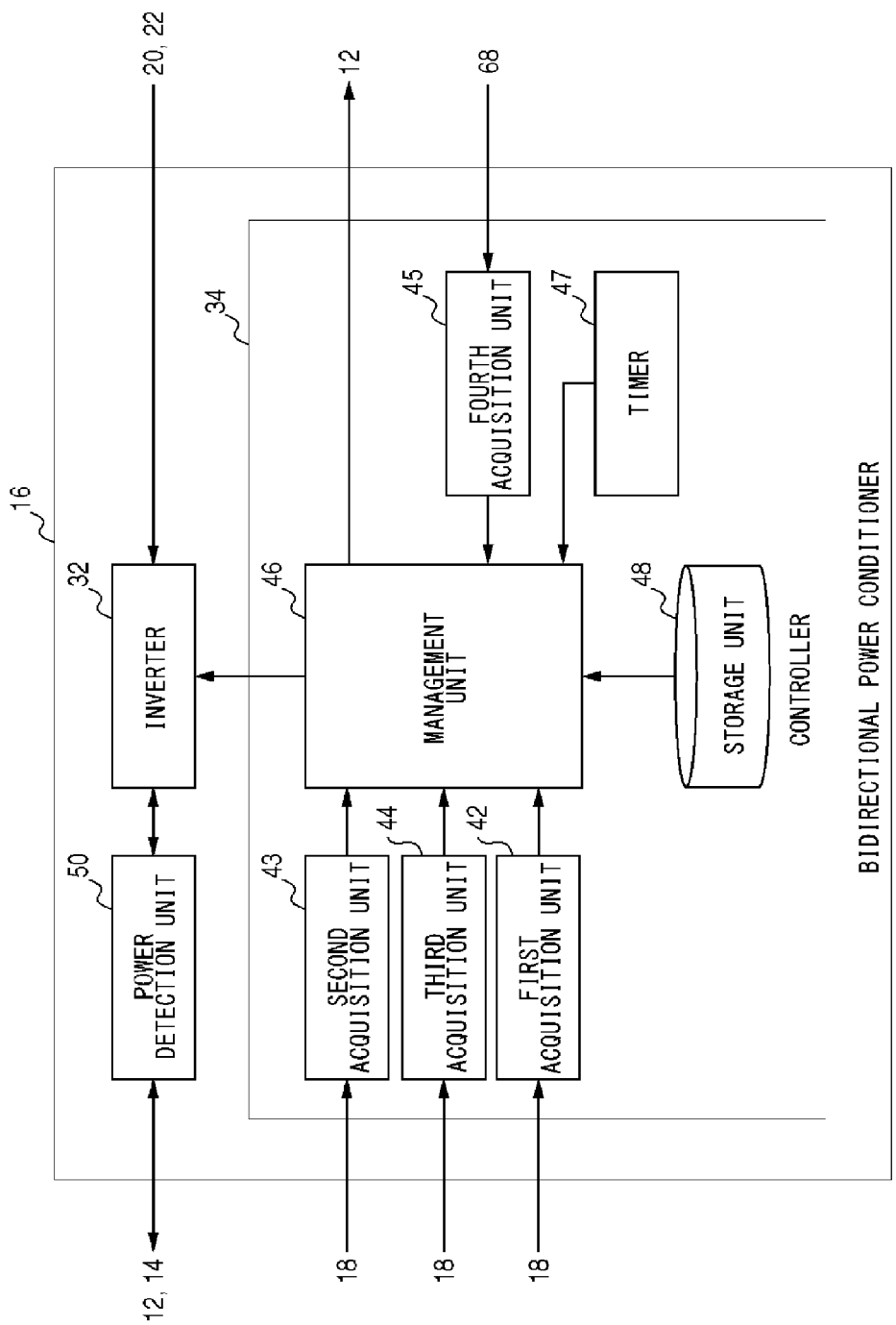
FIG. 9 is a view schematically illustrating the internal configuration of a bidirectional power conditioner according to a variation of Embodiment 1 of the invention.

FIG. 9 is a view schematically illustrating the internal configuration of a bidirectional power conditioner 16 according to a variation of Embodiment 1 of the present invention. The bidirectional power conditioner 16 according to a variation of Embodiment 1 includes an inverter 32, a controller 34, and a power detection unit 50. The controller 34 further includes a first acquisition unit 42, a second acquisition unit 43, a third acquisition unit 44, a fourth acquisition unit 45, a management unit 46, a timer 47, and a storage unit 48.

The storage battery controller 18 measures the voltage, power, and current in the storage battery 14 connected to the solar cell 10, as described above with reference to FIG. 1. The first acquisition unit 42 acquires, from the storage battery controller 18, the present voltage value of the amount of stored power in the storage battery 14. The third acquisition unit 44 acquires, from the storage battery controller

18, the power value or current value in the storage battery 14. The power detection unit 50 is installed between a branched pathway, branched from a point between the solar cell 10 and the storage batteries 14, and the inverter 32 in order to measure the amount of DC power to be converted into AC power in the inverter 32. The second acquisition unit 43 acquires the power value in the storage battery 14.

The storage battery 14 is formed, for example, by a lithium ion secondary battery. Control of the amount of stored power, which is a structure for preventing overcharge into the storage battery 14, will be first described. When the storage battery 14 is charged so as to have a voltage exceeding an upper limit voltage that causes overcharge, the management unit 46 determines that the amount of stored power is in an overcharge state. Of the power generated by the solar cell 10, the remaining surplus power, not consumed by the load 26, is used for charging the storage battery 14. When the power consumed in the load 26 is small or when the bidirectional power conditioner 16 is electrically separated from the load 26, the power generated by the solar cell 10 remains as surplus power. If the storage battery 14 is in a state close to a fully charged state in such a case, the storage battery 14 may be overcharged.

Additionally, the internal resistance of the storage battery 14 is raised as the temperature becomes low, and hence the voltage in the storage battery 14 may exceed the upper limit voltage when the storage battery 14 is charged at a low temperature, which may be determined that the amount of stored power is in an overcharge state. Further, if the storage battery 14 is charged with a large current, the voltage in the storage battery 14 is increased by an influence of the internal resistance thereof, and hence the voltage may exceed the upper limit voltage. Accordingly, the storage battery 14 may be determined to be in an overcharge state.

So, when the power to be converted by the inverter 32 is reduced with the bidirectional power conditioner 16 reducing its output, and when the storage battery 14 is close to a fully charged state, i.e., when the voltage in the storage battery 14 is close to the upper limit voltage, the management unit 46 turns off the second switch in order to block the power generated by the solar cell 10 from being transmitted to the storage battery 14. Specifically, the management unit 46 compares the voltage in the storage battery 14, acquired by the first acquisition unit 42, with a first threshold value. Herein, the "first threshold value" means an overcharge prevention reference value that is set such that, for example, the management unit 46 determines whether the connection between the solar cell 10 and the storage battery 14 is disconnected. The overcharge prevention reference value may be determined by experiment in consideration of the property, etc., of a battery that forms the storage battery 14; however, in the description of the variation of Embodiment 1, the reference value is set to be the upper limit voltage of the storage battery 14 or be a voltage slightly lower than that so as to have a margin.

The management unit 46 also compares the power value, acquired by the second acquisition unit 43, with a second threshold value. Herein, the "second threshold value" means an overcharge prevention reference value that is set such that, for example, the management unit 46 determines whether the connection between the solar cell 10 and the storage battery 14 is disconnected. Based on the values detected by the storage battery power detection unit 70, the overcharge prevention reference value is defined to be a negative value when the value of the power or current to be discharged by the storage battery 14 is set to be positive and the value of the power or current to be charged into the storage battery 14 is to be negative. Although the overcharge prevention reference value may be a fixed value, but by making it to be a variable value that varies with the voltage in the storage battery 14, overcharge can also be accurately prevented. Alternatively, the overcharge prevention reference value may also be determined by experiment in consideration of the property, etc., of a battery that forms the storage battery 14.

When the voltage acquired by the first acquisition unit 42 is larger than the first threshold value and when the power value acquired by the second acquisition unit 43 is smaller than the second threshold value, the management unit 46 causes the second switch 12 to be turned off and causes the solar cell 10 to be electrically disconnected from the storage battery 14. Alternatively, when the power value or current value acquired by the second acquisition unit 43 is less than 0, the management unit 46 may cause the second switch 12 to be turned off and cause the solar cell 10 to be electrically disconnected from the storage battery 14. Thereby, the power to be supplied to the storage battery 14 close to a fully charged state is blocked and the power generated by the solar cell 10 is prevented from being transmitted to the storage battery 14, thereby allowing overcharge of the storage battery 14 to be prevented beforehand.

Subsequently, control of a current value, which is a structure for preventing a charge overcurrent into the storage battery 14, will be described. As described above, if the storage battery 14 is charged with a large current, the voltage in the storage battery 14 is increased by an influence of the internal resistance thereof, which may cause overcharge with the voltage exceeding the upper limit voltage. Further, if a large current flows into the storage battery 14, the storage battery 14 may be deteriorated. Therefore, it is necessary to control a current value also for preventing the deterioration of the storage battery 14 and for maintaining the safety thereof.

So, the control, which is the same as the structure for preventing overcharge, is also applied to a structure for preventing a charge overcurrent. Specifically, the third acquisition unit 44 acquires the current value in the storage battery 14 from the storage battery controller 18. Herein, the storage battery controller 18 acquires the current in the storage battery 14 from the storage battery power detection unit 70. The management unit 46 compares the current value in the storage battery 14, acquired by the third acquisition unit 44, with a third threshold value. Herein, the "third threshold value" means an overcurrent prevention reference value that is set such that, for example, the management unit 46 determines whether the connection between the solar cell 10 and the storage battery 14 is disconnected. The overcurrent prevention reference value is defined to be a positive value when a current to be charged into the storage battery 14 is set to be positive. An overcurrent can be accurately prevented by setting, similarly to the second threshold value, the overcurrent prevention reference value to be a variable value that varies with the voltage in the storage battery 14. Although the overcurrent prevention reference value may be determined by experiment in consideration of the property, etc., of a battery that forms the storage battery 14, it is preferable to set the prevention reference value to be slightly lower than the charge overcurrent so as to have, for example, the margin of the storage battery 14.

When the current value acquired by the third acquisition unit 44 becomes larger than the third threshold value, the management unit 46 causes the second switch 12 to be turned off and causes the solar cell 10 to be electrically disconnected from the storage battery 14. Thereby, the power to be supplied to the storage battery 14 close to a fully charged state is blocked, and the power generated by the solar cell 10 can be prevented from being transmitted to the storage battery 14.

Herein, the storage battery power detection unit 70 measures the voltage and current in the storage battery 14, but those may be measured by a solar cell power meter (not illustrated) that has been separately installed near the output terminal of the solar cell 10. The management unit 46 can acquire the value of the power generated by the solar cell by measuring the solar cell power meter. Accordingly, the DC power to be converted into AC power in accordance with a variation in the output of the solar cell can be calculated such that a current does not flow into the storage battery 14 that is in a fully charged state. Alternatively, the power detection unit 50, used for measuring the value of the DC power to be converted into AC power in the inverter 32, may be installed between a branched pathway, branched from a point between the solar cell 10 and the storage battery 14, and the inverter 32. The total of the power to be converted in the inverter 32 and the power in the storage battery 14 measured by the storage battery power detection unit 70 can be made equal to the power generated by the solar cell 10 by installing the power detection unit 50. Thus, the power generated by the solar cell 10 can be calculated from the measurement results of the power detection unit 50 and the storage battery power detection unit 70. Accordingly, of the respective power measured by the power detection unit 50, the storage battery power detection unit 70, and the solar cell power meter, by measuring any two of them, the remaining power can be calculated. Accordingly, all of the power detection unit 50, the storage battery power detection unit 70, and the solar cell power meter are not necessary, and it is enough to install at least the power detection unit 50 and the solar cell power meter.

Electrical disconnection between the solar cell 10 and the storage battery 14 has been described above. Subsequently, the control, in which the solar cell 10 and the storage battery 14 are reconnected to each other, will be described.

A first reconnection condition for reconnecting the solar cell 10 to the storage battery 14 will be first described. When the voltage acquired by the first acquisition unit 42 is smaller than the first threshold value and when the power or current acquired by the third acquisition unit 44 is smaller than the third threshold value, the management unit 46 causes the second switch 12 to be turned on and causes the solar cell 10 to be electrically connected to the storage battery 14. Thereby, the voltage and current in the storage battery 14 do not exceed their upper limits, and hence overcharge of the storage battery 14 can be prevented and the charge overcurrent can be prevented from flowing. Herein, the electric connection between the solar cell 10 and the storage battery 14 is blocked, and hence the current acquired by the third acquisition unit 44 is only a current from the commercial power supply 24.

Subsequently, a second reconnection condition will be described. When the voltage in the storage battery 14 is close to the upper limit voltage and when surplus power, generated due to the amount of the power generated by the solar cell 10, is present in the case of the aforementioned connection, the surplus power flows into the storage battery 14 when the second switch 12 is turned on and when the solar cell 10 is electrically connected to the storage battery 14. As a result, the amount of the stored power in the storage battery 14 exceeds the first threshold value and the second switch is turned off again, which electrically disconnects the solar cell 10 from the storage battery 14. Accordingly, the voltage in the storage battery 14 repeats increases and decreases near the upper limit voltage and the second switch 12 is turned on and off frequently, which may cause a decrease in the life of the switch.

So, after a certain period of time has passed since the second switch 12 is turned off, the management unit 46 applies the aforementioned first reconnection condition. Specifically, the management unit 46 measures the elapsed time after the second switch 12 is turned off by using the timer 47, and applies the first reconnection condition after a predetermined period of time has passed. Because the power in the storage battery 14 is consumed in the load 26 with a predetermined period of time elapsing, the voltage in the storage battery 14 becomes lower than the upper limit voltage. Thereby, the second switch 12 can be prevented from being turned on and off frequently. The period of time while the second switch 12 is being turned off may be any one when the voltage in the storage battery 14 is reduced by being consumed in the load, which may be freely set by a user. A setting can be considered, in which, for example, the setting time of the timer 47 is changed depending on time zones in a day. In the time zone after the amount of the power generated by the solar cell 10 becomes a maximum, the amount of the generated power is reduced, and hence surplus power, if generated, is reduced with an elapsed time. Additionally, after the amount of the power generated by the solar cell 10 becomes a maximum, surplus power is hardly generated as a time elapses. Accordingly, the voltage in the storage battery 14 hardly exceeds the upper limit voltage in the time zone after the amount of the power generated by the solar cell 10 becomes a maximum, even if the setting time of the timer 47 is set to be short, and hence it is not necessary to disconnect the solar cell 10 from the storage battery 14 again. Also, the period of time, while the solar cell 10 is being disconnected, can be shortened by shortening the setting time of the timer 47, and hence the storage battery 14 can be efficiently charged and discharged. Herein, the setting time of the timer 47 may be preset to be a predetermined period of time, for example, such as 30 minutes between 0:00 and 12:00 and 15 minutes between 12:00 and 24:00; however, the setting may be changed depending on season or weather, because the time zone, when the amount of the power generated by the solar cell 10 becomes a maximum, is changed depending on natural conditions such as season and weather. Alternatively, a setting may be adopted, in which the setting time of the timer is increased or reduced in proportion to an increase or reduction in the amount of the power generated by the solar cell. Herein, the "predetermined period of time" means a switch switching reference time for preventing the second switch 12 being turned on and off frequently, which may be determined by experiment in consideration of the performance, etc., of the second switch 12.

Subsequently, a third reconnection condition, for avoiding a situation in which the solar cell 10 should be electrically disconnected again from the storage battery 14 immediately after they are electrically connected, will be described. In the first reconnection condition and the second reconnection condition, the processing, in which the second switch 12 is disconnected when surplus power generated due to the amount of the power generated by the solar cell 10 is present, is performed, but the surplus power is consumed in the load 26 when the load 26 consumes a large amount of power.

So, the power distribution system 100 according to is the variation of Embodiment 1 includes the fourth acquisition unit 45 for acquiring the power supplied from the commercial power supply 24. The fourth acquisition unit 45 acquires, from the distribution board 68, the value of the power supplied by the commercial power supply 24. Even if the solar cell 10 is not electrically connected to the storage battery 14 in the first or second reconnection condition, the management unit 46 causes the second switch 12 to be turned on when the power supplied from the commercial power supply 24 is larger than or equal to a fourth threshold value. In this case, the load 26 consumes a large amount of power and the surplus power generated by the solar cell 10 is consumed by the load 26 even if the solar cell 10 is electrically connected to the storage battery 14, and hence the storage battery 14 is not charged and the second switch 12 is not disconnected.

The control, in which the state where the solar cell 10 is electrically disconnected from the storage battery 14 is maintained for a certain period of time, has been described in the second reconnection condition. Subsequently, a fourth reconnection condition, which is a variation of the second reconnection condition, will be described. In the second reconnection condition, the second switch 12 cannot be turned on before a certain period of time elapses. Accordingly, even if the power in the storage battery 14 is consumed because the load 26 consumes a large amount of power and even if the amount of the stored power in the storage battery 14 is within a range in which the storage battery 14 can be charged, the power generated by the is solar cell 10 cannot be charged by turning on the second switch 12 before a certain period of time elapses.

So, a transition state directed to the stored power state of the storage battery 14 is preset. For example, by presetting an overcharge voltage range and a charge voltage range of the storage battery 14 in order to determine whether the stored power state makes a transition depending on whether a voltage is within the preset ranges, the management unit 46 causes the second switch 12 to be turned on when the voltage in the storage battery 14 makes a transition to the charge voltage range, regardless of an elapsed time even if the management unit 46 performs the control in which the second reconnection condition is applied. In this case, when the storage battery 14 is in a state where the storage battery 14 can be charged, during a state where the solar cell 10 can generate power, the management unit 46 can cause the solar cell 10 to be electrically connected to the storage battery 14 without waiting for a time. The transition state directed to the stored power state may be any one as far as the stored power state of the storage battery 14 can be known by it, and for example, a range of the stored power amount can be considered.

With respect to the condition for disconnecting the second switch 12, when the voltage acquired by the first acquisition unit 42 is larger than the first threshold value or the current value acquired by the third acquisition unit 44 is larger than the third threshold value, and when the power value in the storage battery 14, acquired by the second acquisition unit 43, can be assumed to become smaller than a fifth threshold value even if the power value is initially larger than the second threshold value, the management unit 46 may cause the solar cell 10 to be electrically disconnected from the storage battery 14. Specifically, the management unit 46 acquires an actual result value of the power consumed in the load 26 in the past, by referring to the storage unit 48 that stores time-patterns of the power consumed by the load 26 in the past.

Figure 10:
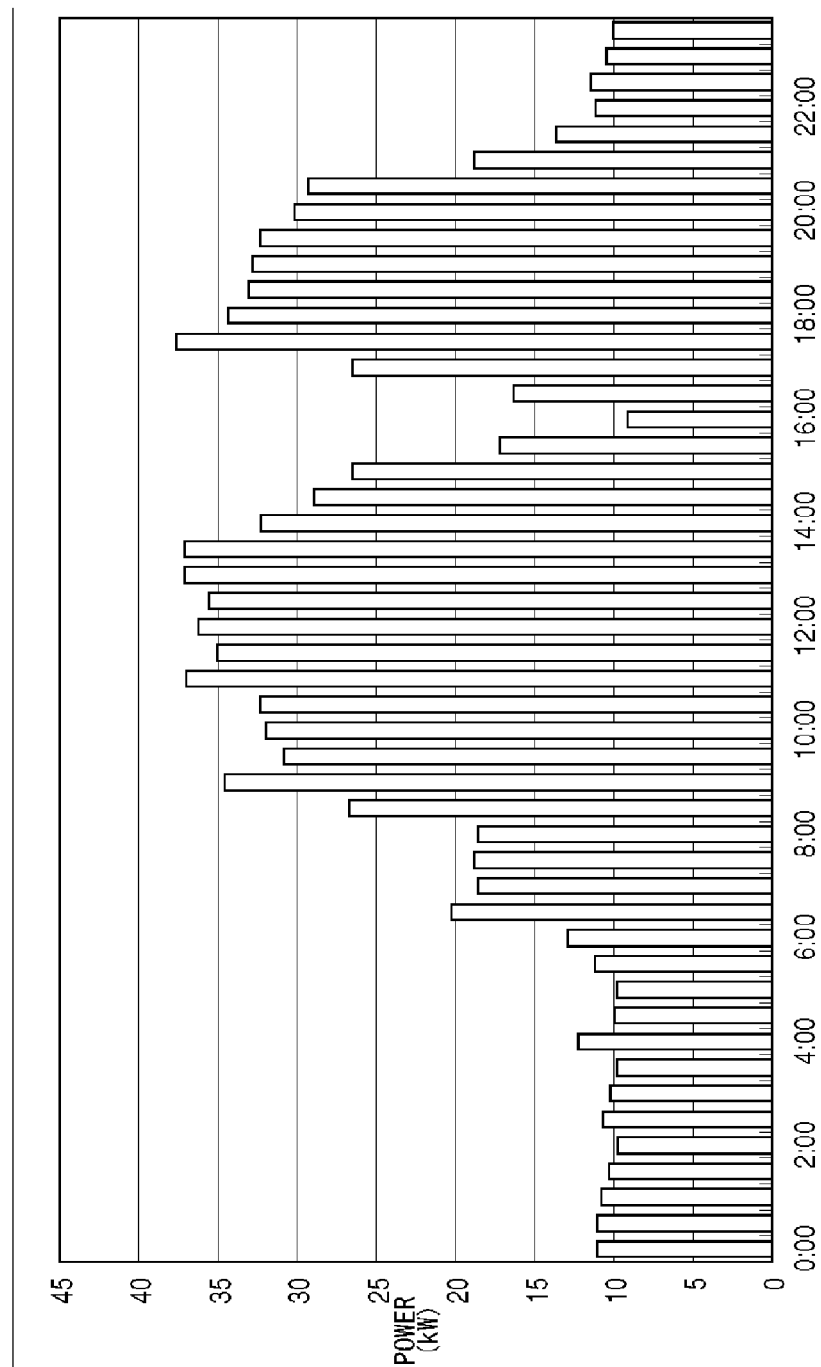
FIG. 10 is a graph showing an example of the time-patterns of the power consumed in a load, stored by a storage unit according to the variation of Embodiment 1 of the invention.

FIG. 10 is a graph showing an example of the time-patterns of the power consumed in the load 26 stored by the storage unit 48. FIG. 10 is a graph in which time is represented by the horizontal axis and the power consumed in the load 26 at each time is represented by the vertical axis.

In the example shown in FIG. 10, it is assumed that the power consumed in the load 26 at 16:00 is smaller than that at a time near to it and is smaller than or equal to the fifth threshold value. Herein, the "fifth threshold value" means an overcharge prevention reference consumed power value that is set such that, for example, the management unit 46 determines whether the connection between the solar cell 10 and the storage battery 14 is electrically disconnected. The overcharge prevention reference consumed power value may be determined by experiment in consideration of the property of a battery that forms the storage battery 14 and a time-pattern of the power consumed in the load 26, etc., which may be the same value as the second threshold value as an example.

When the actual result value of the power consumed in the load 26 at 16:00, acquired by referring to the storage unit 48, is smaller than or equal to the fifth threshold value even if the power actually consumed by the load 26 at the present time of 15:00, namely, the power value in the storage battery 14 is larger than the second threshold value, the management unit 46 causes the second switch 12 to be turned off and causes the solar cell 10 to be electrically disconnected from the storage battery 14.

Thereby, when the probability that the power value in the storage battery 14 may become smaller than the second threshold value is high, it becomes possible to cause the solar cell 10 to be electrically disconnected from the storage battery 14 before the power value in the storage battery 14 becomes smaller than the second threshold value. This is more advantageous than the case where they are electrically disconnected from each other when the power value in the storage battery 14 actually becomes smaller than the second threshold value, in terms that overcharge and a charge overcurrent in the storage battery 14 can be prevented more effectively. A time-pattern of consumed power stored in the storage unit 48 may be updated by using the actual result value of the power consumed by the load 26. This is advantageous in terms that a time-pattern can be updated by new information.

FIG. 11 is a table showing the relationship between the magnitude relationship of the information acquired by the management unit 46 to the threshold values and on-off states of the second switch 12. As shown in FIG. 11, it is basically designed that, when the voltage in the storage battery 14 is larger than the first threshold value and when the power value therein is smaller than the second threshold value, the management unit 46 causes the second switch 12 to be turned off and causes the solar cell 10 to be electrically disconnected from the storage battery 14. However, when the actual result value of the power consumed by the load 26 in the past becomes smaller than the fifth threshold value even if the power value in the storage battery 14 is larger than the second threshold value, the management unit 46 causes the solar cell 10 to be electrically disconnected from the storage battery 14. Additionally, when the current in the storage battery 14 is larger than the third threshold value even if the voltage therein is smaller than the first threshold value, the management unit 46 causes the second switch 12 to be turned off and causes the solar cell 10 to be electrically disconnected from the storage battery 14.

Figure 12:
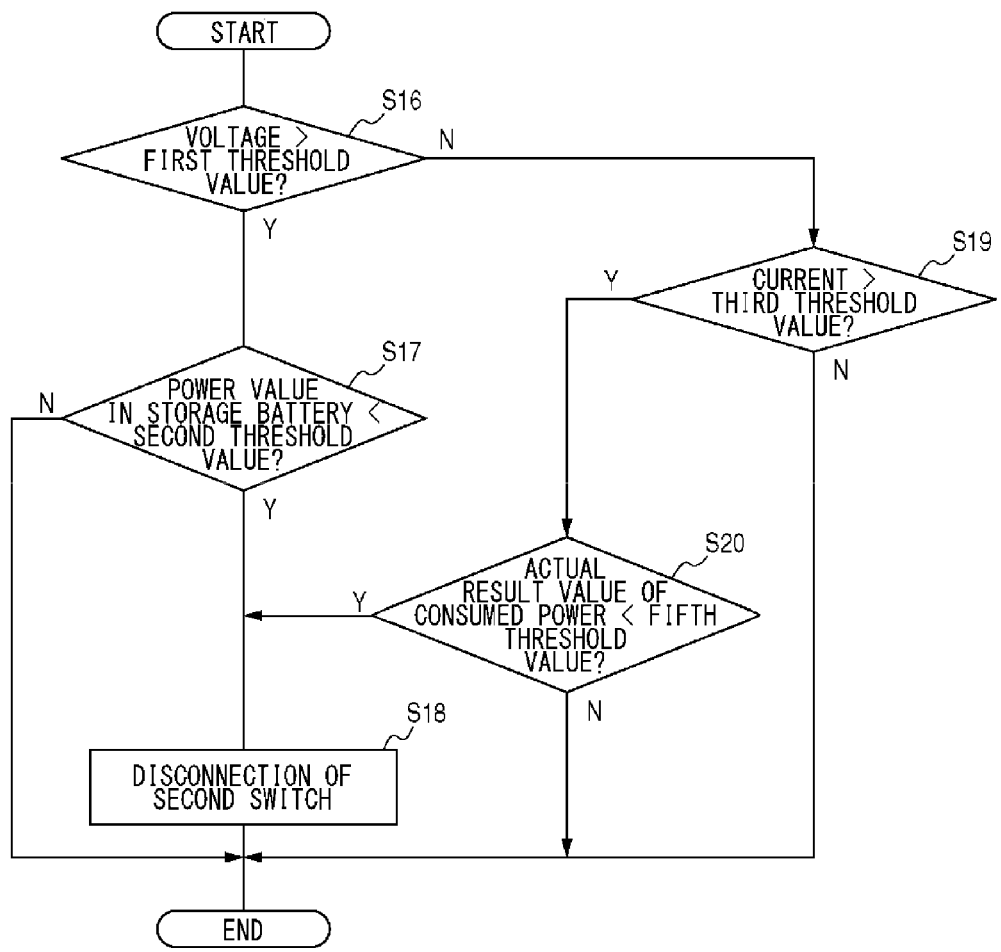
FIG. 12 is a flowchart explaining a flow of processing for disconnecting the second switch in a power distribution system according to the variation of Embodiment 1 of the invention.

FIG. 12 is a flowchart explaining a flow of processing for disconnecting the second switch 12 in the power distribution system 100 according to the variation of Embodiment 1. The processing in this flowchart is started when, for example, the bidirectional power conditioner 16 activated.

The management unit 46 checks whether the present voltage in the storage battery 14, acquired by the first acquisition unit 42 from the storage battery controller 18, exceeds the first threshold value. When the voltage in the storage battery 14 is larger than the first threshold value (S16/Y), the management unit 46 checks whether the value of the power to be converted by the inverter 32, acquired by the second acquisition unit 43 from the power detection unit 50, is less than the second threshold value. When the power value in the storage battery 14 is larger than or equal to the second threshold value (S17/Y), the management unit 46 causes the second switch 12 to be turned off (S18).

When the voltage in the storage battery 14 is smaller than the first threshold value (S16/N), the management unit 46 checks whether the present current in the storage battery 14, acquired by the third acquisition unit 44 from the storage battery controller 18, exceeds the third threshold value. When the present current in the storage battery 14 is larger than the third threshold value (S19/Y), the management unit 46 checks whether the actual result value of the power consumed by the load 26, acquired by referring to the storage unit 48, is less than the fifth threshold value. When the actual result value, acquired by referring to the storage unit 48, is less than the fifth threshold value (S20/Y), the management unit 46 causes the second switch 12 to be turned off (S18).

When the voltage in the storage battery 14 is smaller than or equal to the first threshold value (S16/Y) and when the power value in the storage battery 14 is less than the second threshold value (S17/N), or when the voltage in the storage battery 14 is less than or equal to the first threshold value (S16/N) and when the present current in the storage battery 14 is less than the third threshold (S19/N), or when the voltage in the storage battery 14 is smaller than or equal to the first threshold value (S16/N) and when the present current in the storage battery 14 is larger than the third threshold value (S19/Y) and when the actual result value, acquired by referring to the storage unit 48, is larger than or equal to the fifth threshold value (S20/N), the management unit 46 does not perform particular processing and the second switch 12 maintains the conductive state between the solar cell 10 and the storage battery 14. The management unit 46 controls the electrical connection and disconnection between the solar cell 10 and the storage battery 14 by continuing the aforementioned processing.

Figure 13:
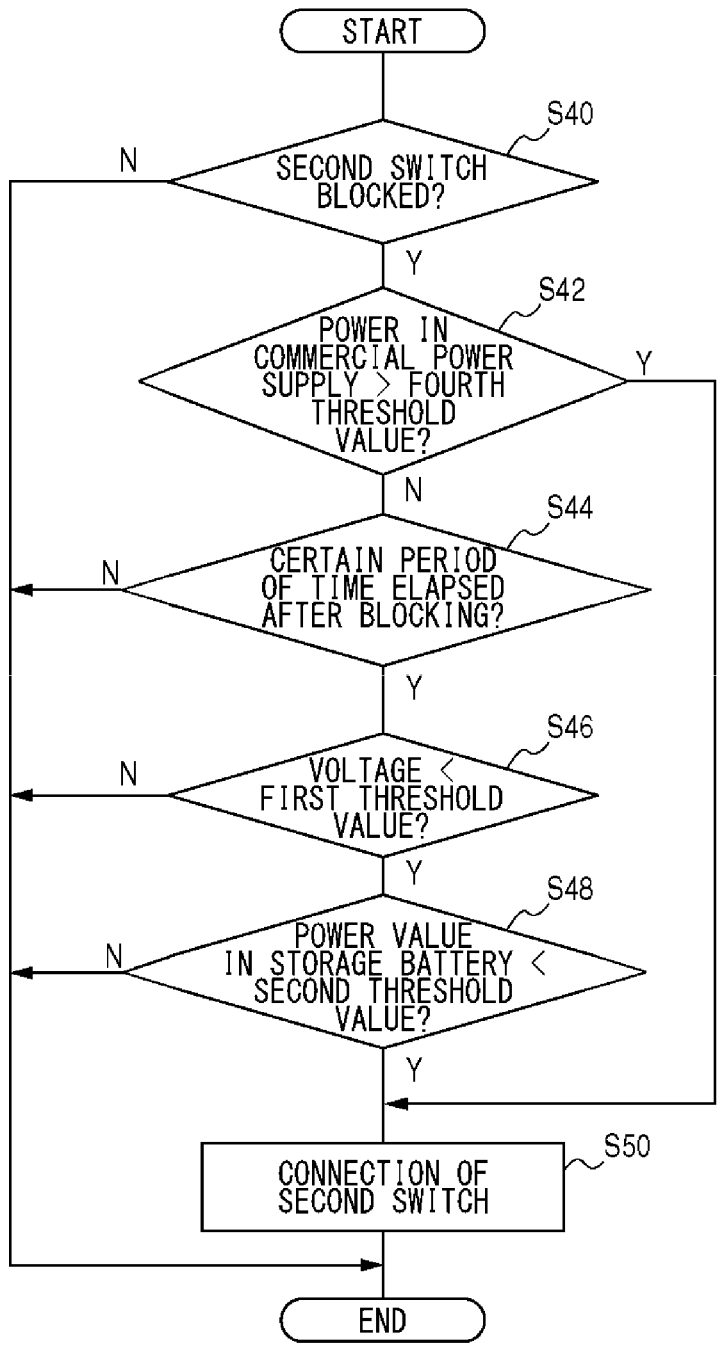
FIG. 13 is a flowchart explaining a flow of processing for reconnecting the second switch in the power distribution system according to the variation of Embodiment 1 of the invention.

FIG. 13 is a flowchart explaining a flow of processing for reconnecting the second switch 12 in the power distribution system 100 according to the variation of Embodiment 1. The processing in this flowchart is started when, for example, the bidirectional power conditioner 16 is activated.

The management unit 46 checks whether the second switch 12, located between the solar cell 10 and the storage battery 14, is blocked. When the second switch 12 is blocked (S40/Y), the management unit 46 compares the fourth threshold value with the amount of the power supplied from the commercial power supply 24, acquired from the fourth acquisition unit 45. When the amount of the power supplied from the commercial power supply 24 is less than the fourth threshold value (S42/N), the management unit 46 acquires, by referring to the timer 47, the elapsed time after the second switch 12 is blocked.

When a predetermined period of time has passed since the second switch 12 is blocked (S44/Y), the management unit 46 checks whether the present voltage in the storage battery 14, acquired by the first acquisition unit 42 from the storage battery controller 18, exceeds the first threshold value. When the voltage in the storage battery 14 is less than the first threshold value (S46/Y), the management unit 46 checks whether the power value in the storage battery 14, acquired by the second acquisition unit 43 from the storage battery power detection unit 70, is less than the second threshold value. When the power value, acquired by the second acquisition unit 43 from the storage battery controller 18, is less than the second threshold value (S48/Y), the management unit 46 causes the second switch 12 to be reconnected (S50).

When the amount of the power supplied from the commercial power supply 24 is larger than or equal to the fourth threshold value (S42/Y), the management unit 46 also causes the second switch 12 to be reconnected (S50). When the second switch 12 is connected (S40/N), or when a predetermined period of time has not passed since the second switch 12 is blocked (S44/N), or when the voltage in the storage battery 14 is larger than the first threshold value (S46/N), or when the value of the power to be converted by the inverter 32 is larger than the second threshold value (S48/N), the management unit 46 does not perform particular processing.

According to the power distribution system 100 of the variation of Embodiment 1, a technique can be provided, in which the amount of the residual stored power in a storage battery, which can be electrically connected to a renewable energy power generator, can be secured and overcharge and a charge overcurrent, which may be caused by the power from the power generator, can be both prevented, as described above. Further, when the current or power, which is charged into or discharged from the storage battery 14, is smaller than the second threshold value even if the voltage in the storage battery 14 exceeds the first threshold value that is set to be lower than the upper limit voltage of the storage battery 14, it is not necessary to electrically disconnect the solar cell 10 from the storage battery 14. Accordingly, the second switch can be prevented from being unnecessarily turned on and off. Furthermore, because the solar cell 10 can be reconnected to the storage battery 14 at a timing in accordance with the stored power state of the storage battery 14 when the solar cell 10 is electrically reconnected to the storage battery 14, overcharge and a charge overcurrent, which may be caused by the power from the power generator, can be prevented also at the time of the reconnection. The control of the electrical connection between the solar cell 10 and the storage battery 14 has been described above.

Embodiment 2

The outline of Embodiment 2 will be described. In a power distribution system 100 according to Embodiment 2, the bidirectional power conditioner 16 according to Embodiment 1 or to the variation of Embodiment 1 and a unidirectional power conditioner 54 of a conventional type are used in combination. In the power distribution system 100 according to Embodiment 2, while a commercial power supply 24 is in a power distribution state, a solar cell 10 is electrically connected, via the unidirectional power conditioner 54, to a power distribution pathway 66 that is an output pathway of the commercial power supply 24, not being electrically connected to a storage battery 14. While the commercial power supply 24 is in a power failure state, the solar cell 10 is electrically disconnected from the unidirectional power conditioner 54 and electrically connected to the storage battery 14 and the bidirectional power conditioner 16.

Hereinafter, the description duplicated with the power distribution system 100 according to Embodiment 1 or to the variation thereof will be appropriately omitted or simplified.

Figure 14:
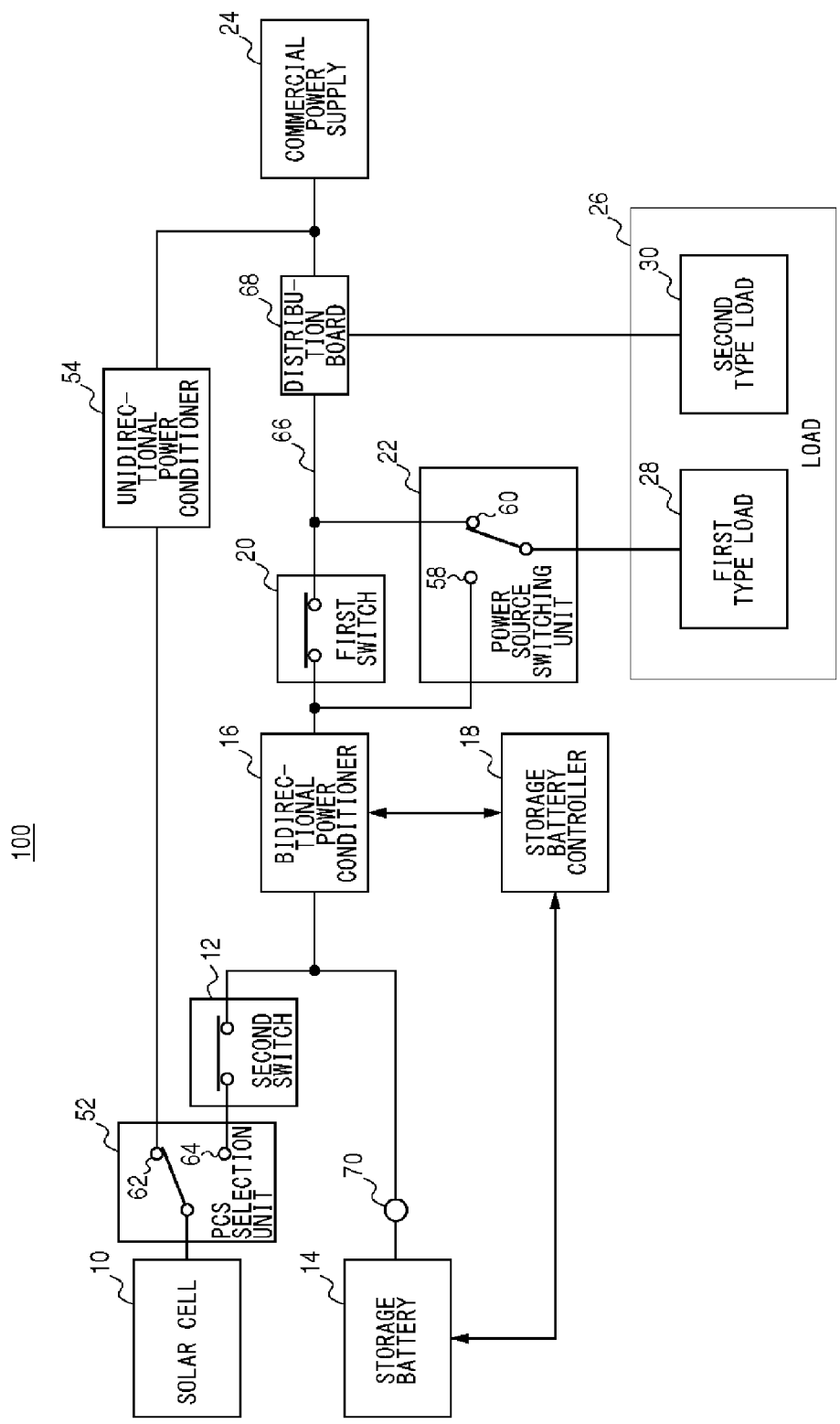
FIG. 14 is a view schematically illustrating a power distribution system according to Embodiment 2 of the invention.

FIG. 14 is a view schematically illustrating the power distribution system 100 according to Embodiment 2 of the present invention. The power distribution system 100 according to Embodiment 2 includes the solar cell 10, the storage battery 14, the commercial power supply 24, the bidirectional power conditioner 16, a storage battery controller 18, a load 26, a first switch 20, a second switch 12, a power source switching unit 22, a power conditioner selection unit 52, and the unidirectional power conditioner 54. Hereinafter in the present description, the power conditioner selection unit 52 may be referred to as a PCS selection unit (Power Conditioner System selection unit) 52.

The unidirectional power conditioner 54 is installed between the solar cell 10 and the commercial power supply 24, and is configured to be electrically connected to the commercial power supply 24 at one end and to be able to be electrically connected to the solar cell 10 at the other end. The unidirectional power conditioner 54 includes a non-illustrated inverter such that the DC power generated by the solar cell 10 is converted into AC power in order to interconnect with the commercial power supply 24.

The PCS selection unit 52 selectively switches whether the solar cell 10 is to be electrically connected to the unidirectional power conditioner 54 or to be electrically connected to the bidirectional power conditioner 16. Specifically, the PCS selection unit 52 selects a first terminal 62 for connecting to the unidirectional power conditioner 54, a second terminal 64 for connecting to the second switch, or an output terminal of the solar cell 10.

Figure 15:
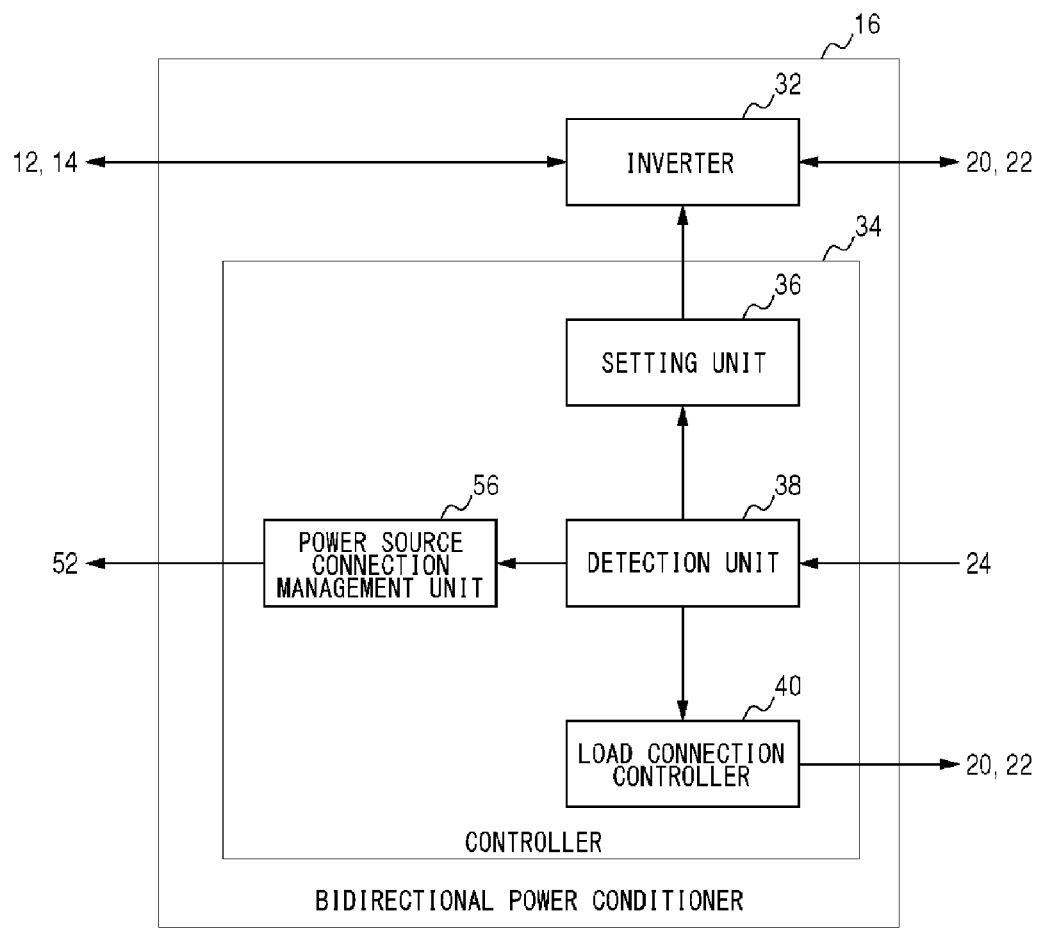
FIG. 15 is a view schematically illustrating the internal configuration of a bidirectional power conditioner according to Embodiment 2 of the invention.

FIG. 15 is a view schematically illustrating the internal configuration of the bidirectional power conditioner 16 according to Embodiment 2 of the present invention. The bidirectional power conditioner 16 according to Embodiment 2 includes an inverter 32 and a controller 34. The controller 34 further includes a setting unit 36, a detection unit 38, a load connection controller 40, and a power source connection management unit 56.

When the power stored by the storage battery 14 is discharged to the load in a daytime zone, the consumption of the power from the commercial power supply, the rate of which is expensive, is reduced, thereby allowing electricity rate to be suppressed and peak shaving to be achieved. In Japan, however, sale of the power generated by fuel cells and secondary batteries is not currently permitted, although sale of the power generated, for example, by solar cells is permitted. Accordingly, with respect to fuel cells and secondary batteries, it is speculated in the "Technical requirements guideline for interconnection to ensure power quality" that surplus power, if generated, should not reversely flow into a commercial power supply system.

In a so-called "double power generation" system in which a fuel cell or a secondary battery is installed in addition to the solar cell 10, the consumed power amount is reduced even in a daytime by supplying the power from the fuel cell or the secondary battery to the load. When the consumed power is reduced, surplus power is increased, and hence the amount of the power that can be sold is increased. In the aforementioned Embodiment 1, the bidirectional power conditioner 16 is present alone, and hence the power outputted through the bidirectional power conditioner 16 is not distinguished to be the power generated by the solar cell 10 or to be the power that has been charged from the commercial power supply 24 into the storage battery 14 and discharged therefrom, thereby not allowing the power to be sold. On the other hand, when the solar cell 10 is separated from the bidirectional power conditioner 16 and connected to the unidirectional power conditioner 54, it becomes possible to sell the surplus power generated by the solar cell 10 by making the surplus power to reversely flow into the commercial power supply 24 via the unidirectional power conditioner 54. While the surplus power generated by the solar cell 10 is reversely flowing into the commercial power supply 24 via the unidirectional power conditioner 54, the power outputted from the bidirectional power conditioner 16 never flows into the commercial power supply 24 from a distribution board 68, as far as the power is less than the total power consumed by a first type load 28 and a second type load 30, thereby also allowing the storage battery 14 to be charged and discharged.

The power source connection management unit 56 controls, in accordance with a determination result of the detection unit 38, whether the solar cell 10 is to be connected to the bidirectional power conditioner 16 connected to the storage battery 14 or to be connected to the commercial power supply 24 via the unidirectional power conditioner 54.

Specifically, when the detection unit 38 determines that the commercial power supply 24 is in a power distribution state, the power source connection management unit 56 does not cause the solar cell 10 to be electrically connected to the bidirectional power conditioner 16 but electrically connected to the commercial power supply 24 via the unidirectional power is conditioner 54. As a result, the solar cell 10 is electrically disconnected from the storage battery 14, and hence the surplus power can be sold. Further, the storage battery 14 is connected to the load 26 via the bidirectional power conditioner 16 to serve as a backup power source in preparation for the case where the commercial power supply 24 is in a power failure state.

When the detection unit 38 determines that the commercial power supply 24 has made a transition to a power failure state, the power source connection management unit 56 causes the solar cell 10 to be electrically disconnected from the unidirectional power conditioner 54 and electrically connected to the bidirectional power conditioner 16. The load connection controller 40 causes the bidirectional power conditioner 16 to be electrically disconnected from the second type load 30. Thereby, the power from the storage battery 14 can be supplied to the first type load 28 that should be driven even if power supply from the commercial power supply 24 is stopped due to power failure thereof. Further, the power generated by the solar cell 10 is supplied via the bidirectional power conditioner 16 and it also becomes possible to store the power generated by the solar cell 10 into the storage battery 14 and to supply it to the first type load 28 at night, and hence it is more advantageous than the case where the storage battery 14 only serves as a backup power source, in terms that backup can be expected for a longer period of time.

When the detection unit 38 determines that the commercial power supply 24 has made a transition from a power failure state to a power distribution state, the power source connection management unit 56 causes the connection between the solar cell 10 and the bidirectional power conditioner 16 to be maintained. On the other hand, the load connection controller 40 causes the bidirectional power conditioner 16 to be electrically disconnected from the first type load 28 and causes the commercial power supply 24 to be electrically connected to the first type load 28 and the second type load 30.

FIG. 16 is a table showing the relationship between a transition of the operation state of the commercial power supply 24 and selection by the power source switching unit 22, according to Embodiment 2 of the present invention, and FIG. 16 is also a view for explaining a method of restarting the system interconnection operation of the power distribution system 100 after the commercial power supply 24 is restored from a power failure state to a power distribution state.

As described above, a user can stop the bidirectional power conditioner 16 by pressing an "operation/stop" button during the autonomous operation thereof, and restart the bidirectional power conditioner 16 by then pressing the "operation/stop" button again. Alternatively, a user can restart the operation of the bidirectional power conditioner 16 by pressing a "reset" button once during the autonomous operation thereof. Upon restarting the operation of the bidirectional power conditioner 16 by a user pressing the "operation/stop" button twice or by pressing the "reset" button once, the detection unit 38 detects whether the commercial power supply 24 is in a power distribution state. When the commercial power supply 24 is in a power distribution state, as a result of the detection by the detection unit 38, the power source connection management unit 56 causes the PCS selection unit 52 to select the first terminal 62. Thereby, the solar cell 10 is electrically connected to the unidirectional power conditioner 54. When the detection unit 38 detects that the commercial power supply 24 has made a transition from a power distribution state to a power failure state, the power source connection management unit 56 causes the PCS selection unit 52 to select the second terminal 64. Thereby, the solar cell 10 is electrically connected to the bidirectional power conditioner 16. Even if it is determined that the commercial power supply 24 has then made a transition from the power failure state to a power distribution state, the power source connection management unit 56 causes the PCS selection unit 52 to maintain the selection of the second terminal 64.

Figure 17:
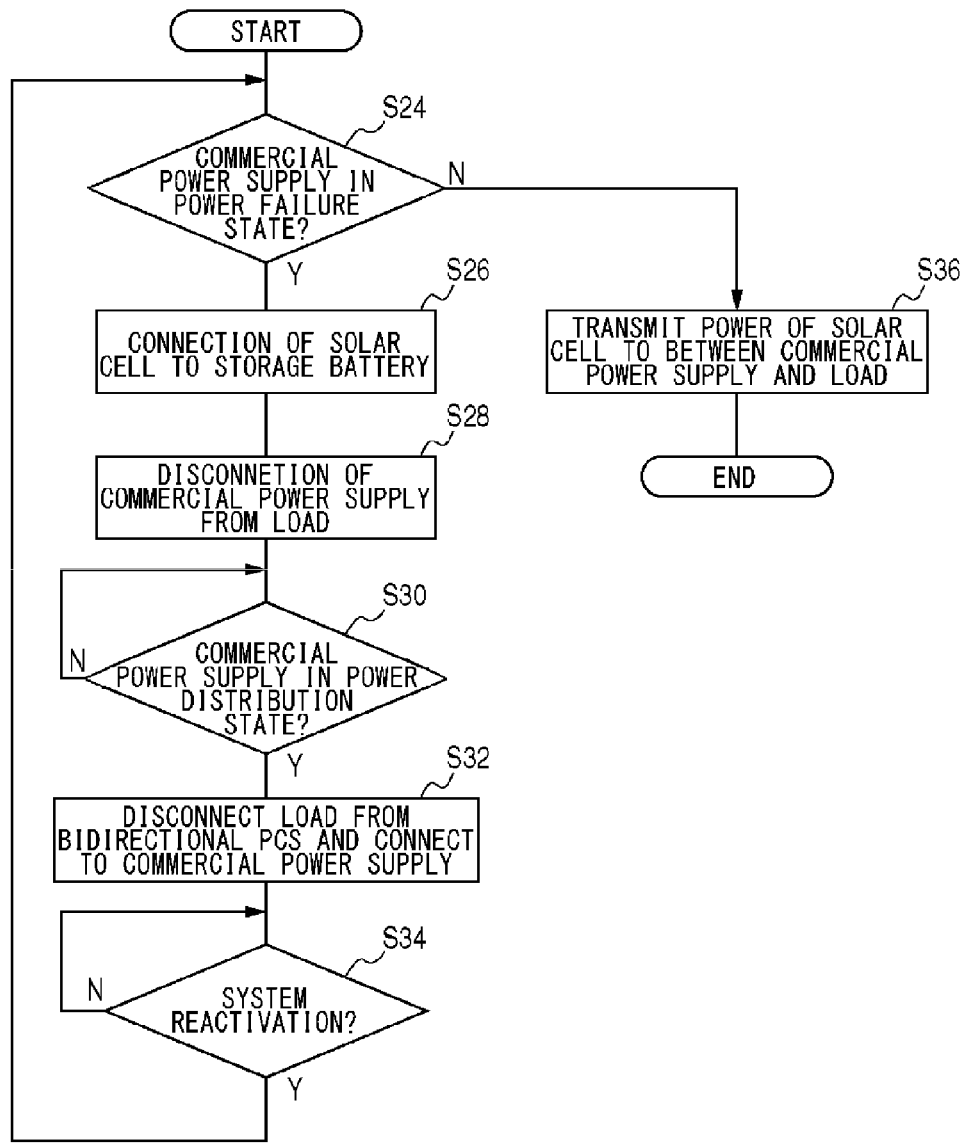
FIG. 17 is a flowchart explaining a flow of processing in the power distribution system according to Embodiment 2 of the invention.

FIG. 17 is a flowchart explaining a flow of processing in the power distribution system 100 according to Embodiment 2 of the present invention. The processing in the invention is started when, for example, the bidirectional power conditioner 16 according to Embodiment 2 is activated.

The detection unit 38 determines whether the commercial power supply 24 is in a power failure state or a power distribution state. When the commercial power supply 24 is in a power failure state (S24/Y) as a result of the determination by the detection unit 38, the power source connection management unit 56 causes the PCS selection unit 52 to select the second terminal 64 such that the solar cell 10 is electrically connected to the storage battery 14 and the bidirectional power conditioner 16 (S26). Additionally, the load connection controller 40 causes the commercial power supply 24 to be electrically disconnected from the first type load 28 (S28).

While the detection unit 38 does not detect a power distribution state of the commercial power supply 24 (S30/N), the electric connection between the solar cell 10 and the bidirectional power conditioner 16 and the electric disconnection between the commercial power supply 24 and the first type load 28 are maintained. When the detection unit 38 determines that the commercial power supply 24 has made a transition from a power failure state to a power distribution state (S30/Y), the load connection controller 40 causes the first type load 28 to be electrically disconnected from the bidirectional power conditioner 16 and electrically connected to the commercial power supply 24 (S32).

Until when the bidirectional power conditioner 16 is reactivated by pressing the "operation/stop" button in the bidirectional power conditioner 16 twice or by pressing the "reset" button once (S34/N), the bidirectional power conditioner 16 maintains the state of being electrically disconnected from the first type load 28. When the bidirectional power conditioner 16 is reactivated by pressing the "operation/stop" button or the reset button in the bidirectional power conditioner 16 (S34/Y), the flow returns to the processing of Step S24.

When the commercial power supply 24 is in a power distribution state as a result of the determination by the detection unit 38 (S24/N), the power source connection management unit 56 causes the PCS selection unit 52 to select the first terminal 62 such that the solar cell 10 is electrically connected to the unidirectional power conditioner 54 (S36). Thereby, the power generated by the solar cell 10 is inputted to the power distribution pathway 66 via the unidirectional power conditioner 54. By continuing the aforementioned processing, the controller 34 in the bidirectional power conditioner 16 according to Embodiment 2 controls the switching in which the power from the solar cell 10 is outputted to the unidirectional power conditioner 54 or to the bidirectional power conditioner 16.

According to the power distribution system 100 of Embodiment 2 of the present invention, it becomes possible to increase the power to be supplied to the first type load 28 by electrically connecting the solar cell 10 to the bidirectional power conditioner 16 during a power failure state of the commercial power supply 24, as described above. It also becomes possible to causes the power generated by the solar cell 10 to reversely flow into the commercial power supply 24 during a power distribution state of the commercial power supply 24. Thereby, it becomes easy to manage the amount of residual stored power in the storage battery 14 that can be connected to the solar cell 10 that is a renewable energy power generator.

Embodiment 1, the variation of Embodiment 1, and Embodiment 2 of the present invention have been described above. Arbitrary combinations of them are also included in embodiments of the invention. A new embodiment obtained by the combinations has the advantages that each of the combined embodiments has.

The present invention has been described above based on embodiments. The embodiments have been described for exemplary purpose only, and it can be readily understood by a person skilled in the art that various modifications may be made to combinations of the respective components or processes, which are also encompassed in the scope of the invention.

For example, the case, where the controller 34 is installed in the bidirectional power conditioner 16, has been described in each of the aforementioned Embodiment 1, the variation of Embodiment 1, and Embodiment 2, but the controller 34 is not essentially required to be installed in the bidirectional power conditioner 16. There is flexibility on where the controller 34 is installed, and may be installed, for example, in the storage battery controller 18, or be present alone.

The invention claimed is:

1. A control device comprising:
   a detection unit that determines whether a commercial power supply is in a power failure state or a power distribution state;
   a power source connection management unit that controls, in accordance with a determination result of the detection unit, whether a renewable energy power generator is to be connected to a first power conditioner connected to a storage battery or to the commercial power supply via a second power conditioner; and a load connection controller that controls, in accordance with a determination result of the detection unit, whether the first power conditioner and the commercial power supply are to be connected to a load or the commercial power supply is to be disconnected from the load while the first power conditioner is being connected to the load, wherein when a determination result of the detection unit is a power distribution state, the power source connection management unit does not causes the power generator to be connected to the first power conditioner but connected to the commercial power supply via the second power conditioner, and the load connection controller causes the first power conditioner and the commercial power supply to be connected to the load, and wherein when a determination result of the detection unit makes a transition from a power distribution state to a power failure state, the power source connection management unit causes the power generator to be disconnected from the second power conditioner and connected to the first power conditioner, and the load connection controller maintains the connection between the first power conditioner and the load and causes the commercial power supply to be disconnected from the load.

2. The control device according to claim 1, wherein when a determination result of the detection unit makes a transition from a power failure state to a power distribution state, the power source connection management unit maintains the connection between the power generator and the first power conditioner, and the load connection controller causes the first power conditioner to be disconnected from the load and causes the commercial power supply to be connected to the load.

3. The control device according to claim 2, wherein when a result of the detection unit makes a transition from a power failure state to a power distribution state and when the detection unit detects a command requesting that the second power conditioner should be reactivated, the power source connection management unit does not causes the power generator to be connected to the first power conditioner but connected to the commercial power supply via the second power conditioner, and the load connection controller causes the first power conditioner and the commercial power supply to be connected to the load.

4. A power distribution system comprising:
a bidirectional power conditioner that is connected to a storage battery at one end and can be connected to a commercial power supply at the other end;
a power conditioner selection unit that selectively connects a renewable energy power generator to a unidirectional power conditioner that is connected to the commercial power supply at one end and can be connected to the power generator at the other end, or connects to the bidirectional power conditioner;
a switch configured that connects or disconnects the bidirectional power conditioner to or from the commercial power supply;
a power source switching unit that selectively connects a load to a first pathway between the switch and the bidirectional power conditioner or to a second pathway between the switch and the commercial power supply; and
a detection unit that determines whether the commercial power supply is in a power failure state or a power distribution state, wherein when a determination result of the detection unit is a power distribution state, the bidirectional power conditioner causes the power conditioner selection unit to connect the power generator to the unidirectional power conditioner, causes the switch to be connected, and causes the power source switching unit to connect the load to the second pathway, and wherein when a result of the detection unit makes a transition from a power distribution state to a power failure state, the bidirectional power conditioner causes the power conditioner selection unit to disconnect the power generator from the unidirectional power conditioner but connect to the bidirectional power conditioner, causes the switch to be disconnected, and causes the power source switching unit to connect the load to the first pathway.

* * * * *